(12) United States Patent
Ui

(10) Patent No.: US 10,097,256 B2
(45) Date of Patent: Oct. 9, 2018

(54) COMMUNICATION APPARATUS, COMMUNICATION METHOD, AND COMPUTER-READABLE STORAGE MEDIUM

(71) Applicant: CANON KABUSHIKI KAISHA, Tokyo (JP)

(72) Inventor: Yutaka Ui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 15/340,079

(22) Filed: Nov. 1, 2016

(65) Prior Publication Data

US 2017/0127294 A1    May 4, 2017

(30) Foreign Application Priority Data

Nov. 2, 2015  (JP) ................................. 2015-215693

(51) Int. Cl.
*H04B 7/06* (2006.01)
*H04L 12/26* (2006.01)
*H04W 24/08* (2009.01)

(52) U.S. Cl.
CPC ........... *H04B 7/0695* (2013.01); *H04B 7/063* (2013.01); *H04L 43/50* (2013.01); *H04W 24/08* (2013.01)

(58) Field of Classification Search
None
See application file for complete search history.

(56) References Cited

U.S. PATENT DOCUMENTS

| 2003/0017852 A1* | 1/2003 | Miyatani | H01Q 1/246 455/562.1 |
| 2013/0229999 A1* | 9/2013 | Da Silva | H04B 7/04 370/329 |
| 2014/0227966 A1* | 8/2014 | Artemenko | H01Q 1/1257 455/9 |
| 2016/0358381 A1 | 12/2016 | Ui et al. | |

FOREIGN PATENT DOCUMENTS

| JP | 2013-511931 A | 4/2013 |
| WO | 2011/078951 A2 | 6/2011 |

* cited by examiner

*Primary Examiner* — Christine Duong
(74) *Attorney, Agent, or Firm* — Carter, DeLuca, Farrell & Schmidt, LLP

(57) ABSTRACT

A communication apparatus with a directional antenna, determines, for each of receivers, transmitter antenna directivities with each of which it is possible to transmit a test signal to the receiver as a partner receiver with a main lobe; determines, as a monitor receiver, for each of the determined directivities, if the test signal is transmitted with the directivity, a receiver capable of receiving the test signal by a side lobe appended to the main lobe; decides, based on reception quality in the partner receiver by the main lobe and reception quality in the monitor receiver by the side lobe, a transmitter antenna directivity, and a partner receiver and monitor receiver as reception targets of the data out of the receivers; and transmits the data to the decided partner receiver and monitor receiver with the decided directivity.

19 Claims, 16 Drawing Sheets

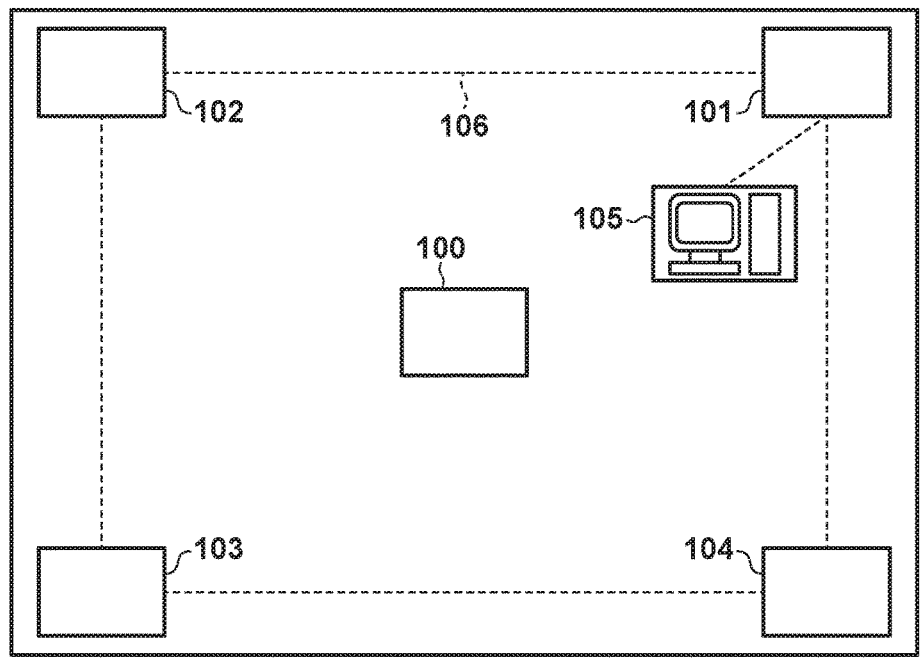
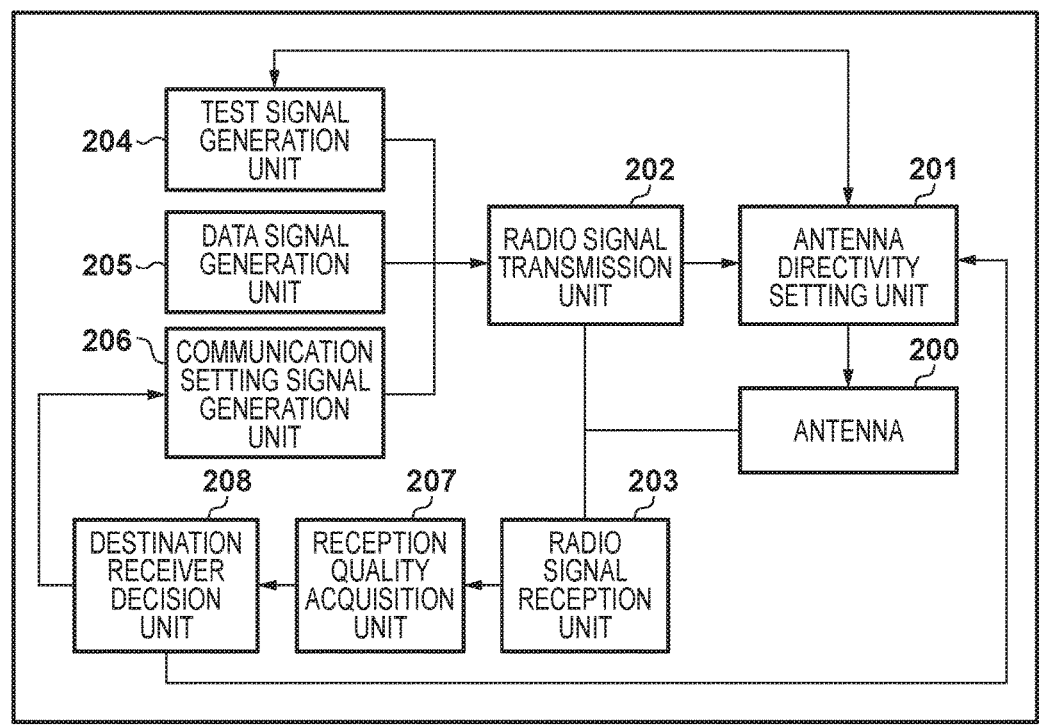

F I G. 3
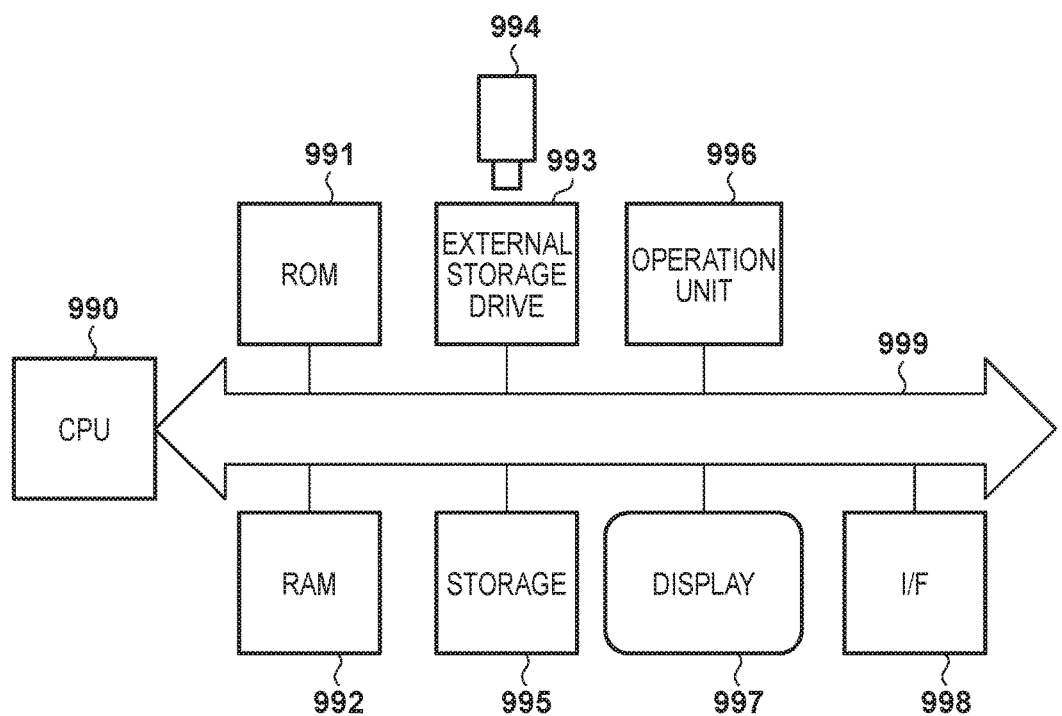

FIG. 9

| TRANSMITTER | TRANSMITTER DIRECTIVITY | 4 | | | | 5 | | | | 8 | | | | 3 | | | | 4 | | | | 12 | | | | ... | 24 | | | |
|---|---|---|---|---|---|---|---|---|---|---|---|---|---|---|---|---|---|---|---|---|---|---|---|---|---|---|---|---|---|---|
| RECEIVER 1 | RECEIVER DIRECTIVITY | \multicolumn{12}{l}{NO RECEPTION OPERATION IS PERFORMED} | | | | | 5 | 6 | 8 | | 5 | 6 | 8 | | 5 | 6 | 8 | | ... | 5 | 6 | 8 | |
| | RECEPTION QUALITY | | | | | | | | | | | | | 0 | 0 | 0 | | 10 | 0 | 0 | | 0 | 0 | 0 | | ... | 0 | 0 | 0 | |
| RECEIVER 2 | RECEIVER DIRECTIVITY | 4 | 5 | 6 | 8 | 4 | 5 | 6 | 8 | \multicolumn{4}{l}{NO RECEPTION OPERATION IS PERFORMED} | | | | | 5 | 6 | 8 | | 5 | 6 | 8 | | ... | 4 | 5 | 6 | 8 |
| | RECEPTION QUALITY | 0 | 0 | 0 | 0 | 30 | 20 | 10 | 0 | | | | | 0 | 0 | 0 | 10 | 10 | 10 | 0 | 0 | 20 | 0 | 0 | ... | 0 | 0 | 0 | 0 |
| RECEIVER 3 | RECEIVER DIRECTIVITY | 6 | 5 | 6 | 8 | 6 | 5 | 6 | 8 | 6 | 5 | 6 | 8 | 6 | 5 | 6 | 8 | 6 | 5 | 6 | 8 | 6 | 5 | 6 | 8 | ... | 6 | 5 | 6 | 8 |
| | RECEPTION QUALITY | 0 | 10 | 0 | 10 | 0 | 10 | 10 | 10 | 0 | 10 | 0 | 10 | 0 | 0 | 0 | 0 | 0 | 0 | 0 | 0 | 0 | 0 | 0 | 0 | ... | 0 | 0 | 0 | 0 |
| RECEIVER 4 | RECEIVER DIRECTIVITY | 1 | 5 | 7 | 5 | 1 | 5 | 7 | 5 | 1 | 5 | 7 | 5 | 1 | 5 | 7 | 7 | 1 | 0 | 5 | 7 | 1 | 5 | 5 | 7 | ... | 6 | 5 | 5 | 6 |
| | RECEPTION QUALITY | 10 | 0 | 0 | 0 | 0 | 0 | 0 | 0 | 0 | 0 | 0 | 0 | 10 | 0 | 0 | 0 | 10 | 0 | 0 | 0 | 0 | 0 | 0 | 0 | ... | 0 | 0 | 0 | 0 |

F I G. 10

| RECEIVER | TRANSMITTER ANTENNA DIRECTIVITY | RECEIVER ANTENNA DIRECTIVITY | RECEIVER SNR | RECEIVER | RECEIVER ANTENNA DIRECTIVITY | RECEIVER SNR | |
|---|---|---|---|---|---|---|---|
| 1 | Beam = 4 | Beam = 5 | 50 | 2 | Beam = 4 | 0 | |
| | | | | | Beam = 5 | 0 | |
| | | | | | Beam = 6 | 0 | |
| | | | | 3 | Beam = 6 | 10 | 901 |
| | | | | | Beam = 5 | 0 | |
| | | | | | Beam = 8 | 0 | |
| | | | | 4 | Beam = 1 | 0 | |
| | | | | | Beam = 5 | 0 | |
| | | | | | Beam = 7 | 0 | |
| | Beam = 5 | Beam = 6 | 40 | 2 | Beam = 4 | 30 | 902 |
| | | | | | Beam = 5 | 10 | |
| | | | | | Beam = 6 | 0 | |
| | | | | 3 | Beam = 6 | 0 | |
| | | | | | Beam = 5 | 0 | |
| | | | | | Beam = 8 | 0 | |
| | | | | 4 | Beam = 1 | 0 | |
| | | | | | Beam = 5 | 0 | |
| | | | | | Beam = 7 | 0 | |
| | Beam = 11 | Beam = 8 | 30 | 2 | Beam = 4 | 0 | |
| | | | | | Beam = 5 | 0 | |
| | | | | | Beam = 6 | 0 | |
| | | | | 3 | Beam = 6 | 0 | |
| | | | | | Beam = 5 | 0 | |
| | | | | | Beam = 8 | 0 | |
| | | | | 4 | Beam = 1 | 0 | |
| | | | | | Beam = 5 | 0 | |
| | | | | | Beam = 7 | 0 | |
| 2 | Beam = 3 | Beam = 4 | 20 | 1 | Beam = 5 | 0 | |
| | | | | | Beam = 6 | 0 | |
| | | | | | Beam = 8 | 0 | |
| ... | ... | ... | ... | ... | ... | ... | |
| 4 | Beam = 24 | Beam = 7 | 40 | 3 | Beam = 6 | 0 | |
| | | | | | Beam = 5 | 0 | |
| | | | | | Beam = 8 | 0 | |

Columns: 910, 911, 912, 913, 914, 915, 916

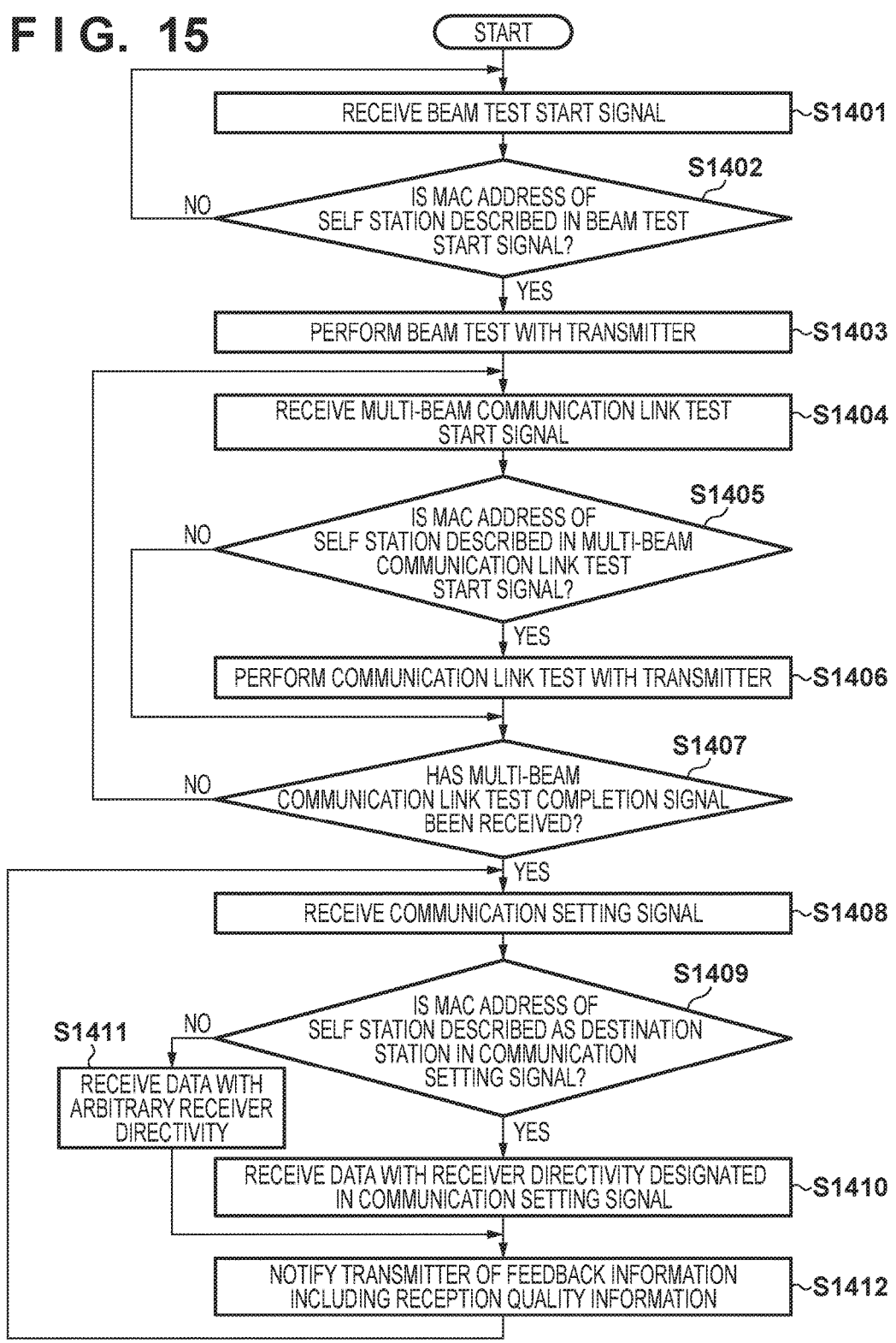

FIG. 16A

| 1510 | 1511 | 1512 | 1513 | 1514 | 1515 | 1516 | 1517 | 1518 | 1519 |
|---|---|---|---|---|---|---|---|---|---|
| RECEIVER | TRANSMITTER ANTENNA DIRECTIVITY | RECEIVER ANTENNA DIRECTIVITY | RECEIVER SNR | RECEIVER | TRANSMITTER ANTENNA DIRECTIVITY | RECEIVER ANTENNA DIRECTIVITY | SNR | MULTI-BEAM FORMATION STATUS | DEGRADATION IN RECEPTION QUALITY OF MULTI-BEAM |
| 1 | Beam = 4 | Beam = 5 | 30 | 2 | Beam = 3 | Beam = 4 | 25 | ○ | |
| | | | | | Beam = 5 | Beam = 5 | 15 | ○ | |
| | | | | 3 | Beam = 12 | Beam = 6 | 50 | × | |
| | | | | | Beam = 17 | Beam = 6 | 30 | × | |
| | | | | | Beam = 18 | Beam = 5 | 20 | × | |
| | | | | | Beam = 19 | Beam = 8 | 40 | ○ | |
| | | | | 4 | Beam = 5 | Beam = 1 | 20 | × | |
| | | | | | Beam = 23 | Beam = 5 | 30 | ○ | |
| | | | | | Beam = 24 | Beam = 7 | 35 | ○ | |
| | Beam = 5 | Beam = 6 | 20 | 2 | Beam = 3 | Beam = 4 | 25 | ○ | |
| | | | | | Beam = 5 | Beam = 5 | 15 | × | |
| | | | | 3 | Beam = 12 | Beam = 6 | 50 | × | |
| | | | | | Beam = 17 | Beam = 6 | 30 | × | |
| | | | | | Beam = 18 | Beam = 5 | 20 | × | |
| | | | | | Beam = 19 | Beam = 8 | 40 | ○ | |
| | | | | 4 | Beam = 5 | Beam = 1 | 20 | × | |
| | | | | | Beam = 23 | Beam = 5 | 30 | × | |
| | | | | | Beam = 24 | Beam = 7 | 35 | × | |

1503

F I G. 16B

| 1510 | 1511 | 1512 | 1513 | 1514 | 1515 | 1516 | 1517 | 1518 | 1519 |
|---|---|---|---|---|---|---|---|---|---|
| RECEIVER | TRANSMITTER ANTENNA DIRECTIVITY | RECEIVER ANTENNA DIRECTIVITY | RECEIVER SNR | RECEIVER | TRANSMITTER ANTENNA DIRECTIVITY | RECEIVER ANTENNA DIRECTIVITY | SNR | MULTI-BEAM FORMATION STATUS | DEGRADATION IN RECEPTION QUALITY OF MULTI-BEAM |
| 1 | Beam = 11 | Beam = 8 | 25 | 2 | Beam = 3 | Beam = 4 | 25 | × | |
| | | | | | Beam = 5 | Beam = 5 | 15 | × | |
| | | | | | Beam = 12 | Beam = 6 | 50 | ○ | × 1501 |
| | | | | 3 | Beam = 17 | Beam = 6 | 30 | × | |
| | | | | | Beam = 18 | Beam = 5 | 20 | × | |
| | | | | | Beam = 19 | Beam = 8 | 40 | × | |
| 2 | Beam = 3 | Beam = 4 | 20 | 4 | Beam = 5 | Beam = 1 | 20 | × | |
| | | | | | Beam = 23 | Beam = 5 | 30 | × | |
| | | | | | Beam = 24 | Beam = 7 | 35 | ○ | |
| | | | | 1 | Beam = 3 | Beam = 5 | 25 | ○ | |
| ... | ... | ... | ... | ... | Beam = 4 | Beam = 6 | 15 | × | |
| | | | | | Beam = 12 | Beam = 8 | 50 | ... | |
| 4 | Beam = 24 | Beam = 7 | 35 | 3 | Beam = 17 | Beam = 6 | 30 | × | |
| | | | | | Beam = 18 | Beam = 5 | 20 | × | |
| | | | | | Beam = 19 | Beam = 8 | 40 | ○ | ○ 1502 |

… # COMMUNICATION APPARATUS, COMMUNICATION METHOD, AND COMPUTER-READABLE STORAGE MEDIUM

BACKGROUND OF THE INVENTION

Field of the Invention

The present invention relates to a communication apparatus, a communication method, and a computer-readable storage medium.

Description of the Related Art

Along with a recent increase in video quality, there is an increasing demand for a technique of performing radio transmission of a large amount of data at a high transmission rate. As a technique of achieving a high radio transmission rate, there is known a radio communication technique using a 60-GHz band called a millimeter wave. In IEEE802.11ad as a millimeter wave radio communication standard, a maximum transmission rate of about 6.8 Gbps is defined. In millimeter wave radio communication, there is known a technique of enlarging a communication range by concentrating energy in a specific direction using, as a communication antenna, a beam directional antenna capable of beam steering.

Although millimeter wave radio communication can obtain a high radio transmission rate, a communication path may be blocked by an obstacle such as a human body due to the straightness of a millimeter wave, thereby causing a communication error. From this viewpoint, a system arrangement including a spare communication path is useful to prevent a communication path from being blocked by an obstacle. Japanese Patent Laid-Open No. 2013-511931 describes the arrangement of a radio communication system which includes a plurality of communication links between a transmission station and a reception station and simultaneously transmits data using the plurality of communication links.

As described above, by including a plurality of spare communication paths, it is possible to cope with blockage of a communication path. However, if one receiver is included for one transmitter, there is a situation that it becomes impossible to use a plurality of communication links at the same time, for example, when an obstacle exists near the receiver. Thus, the method of simultaneously transmitting data between one transmitter and one receiver using the plurality of communication links, which is described in Japanese Patent Laid-Open No. 2013-511931, cannot be applied to a radio system in which a situation that there is no communication link between one transmitter and one receiver occurs.

In the above-described radio system in which a situation that no communication link can be ensured between radio stations may occur, it is possible to improve the communication robustness by applying an arrangement including a plurality of reception stations for one transmission station. However, for example, if radio communication is executed by assigning, to a plurality of receivers, a time slot in time division multiplexing communication, it is possible to improve the communication robustness but the communication efficiency deteriorates. If an arrangement for performing multicast communication by setting a plurality of receivers as destination stations is applied, the communication efficiency does not deteriorate. However, if, for example, an omni directivity (non-directional) is applied as an antenna directivity which can be covered by a plurality of receivers, a communication distance is limited, as compared with a case in which a beam directivity (directional) is applied. Therefore, switching the directional antenna from the beam directivity to the omni directivity may cause a communication error, and thus it is impossible to improve the communication robustness.

As described above, in the conventional arrangement, a change in radio environment such as blockage of a communication path by an obstacle like a human body or a change in communication environment caused by movement of a radio set degrades at least one of the communication efficiency and the communication robustness.

SUMMARY OF THE INVENTION

The present invention provides a technique capable of maintaining the communication efficiency while improving the robustness against a change in radio environment in a radio communication system using a beam directional antenna.

According to one aspect of the present invention, a communication apparatus for transmitting data using a directional antenna, includes: a first determination unit adapted to determine, for each of a plurality of receivers, transmitter antenna directivities with each of which it is possible to transmit a test signal to the receiver as a partner receiver by communication by a main lobe; a second determination unit adapted to determine, as a monitor receiver, for each of the transmitter antenna directivities determined by the first determination unit, if the test signal is transmitted with the transmitter antenna directivity, a receiver capable of receiving the test signal by a side lobe appended to the main lobe; a decision unit adapted to decide, based on reception quality in the partner receiver of the communication by the main lobe and reception quality in the monitor receiver of communication by the side lobe appended to the main lobe, a transmitter antenna directivity to be used to transmit data, and a partner receiver and monitor receiver as reception targets of the data out of the plurality of receivers; and a transmission unit adapted to transmit the data to the decided partner receiver and monitor receiver with the transmitter antenna directivity decided by the decision unit.

According to another aspect of the present invention, a communication apparatus for transmitting data using a directional antenna, includes: a first determination unit adapted to determine, for each of a plurality of receivers, transmitter antenna directivities with each of which it is possible to transmit a test signal to the receiver by communication by a main lobe; a second determination unit adapted to determine a combination of transmitter antenna directivities with which it is possible to transmit the test signal based on communications with a plurality of transmitter antenna directivities included in the transmitter antenna directivities determined by the first determination unit; a decision unit adapted to decide, based on reception qualities of the communications with transmitter antenna directivities included in the combination of transmitter antenna directivities, a combination of transmitter antenna directivities to be used to transmit data and a receiver as a reception target of the data; and a transmission unit adapted to transmit the data to the decided receiver with the combination of transmitter antenna directivities decided by the decision unit.

According to still another aspect of the present invention, a communication method using a directional antennal, includes: causing a first determination unit to determine, for each of a plurality of receivers, transmitter antenna directivities with each of which it is possible to transmit a test signal to the receiver as a partner receiver by communication by a main lobe; causing a second determination unit to determine, as a monitor receiver, for each of the transmitter antenna directivities determined in the causing the first determination unit, if the test signal is transmitted with the transmitter antenna directivity, a receiver capable of receiving the test signal by a side lobe appended to the main lobe; causing a decision unit to decide, based on reception quality in the partner receiver of the communication by the main lobe and reception quality in the monitor receiver of communication by the side lobe appended to the main lobe, a transmitter antenna directivity to be used to transmit data, and a partner receiver and monitor receiver as reception targets of the data out of the plurality of receivers; and causing a transmission unit to transmit the data to the decided partner receiver and monitor receiver with the transmitter antenna directivity decided in the causing the decision unit.

According to yet another aspect of the present invention, a communication method using a directional antenna, includes: causing a first determination unit to determine, for each of a plurality of receivers, transmitter antenna directivities with each of which it is possible to transmit a test signal to the receiver by communication by a main lobe; causing a second determination unit to determine a combination of transmitter antenna directivities with which it is possible to transmit the test signal based on communications with a plurality of transmitter antenna directivities included in the transmitter antenna directivities determined in the causing the first determination unit; causing a decision unit to decide, based on reception qualities of the communications with transmitter antenna directivities included in the combination of transmitter antenna directivities, a combination of transmitter antenna directivities to be used to transmit data and a receiver as a reception target of the data; and causing a transmission unit to transmit the data to the decided receiver with the combination of transmitter antenna directivities decided in the causing the decision unit.

Further features of the present invention will become apparent from the following description of exemplary embodiments (with reference to the attached drawings).

BRIEF DESCRIPTION OF THE DRAWINGS

FIG. 1 a view showing an example of the arrangement of a radio communication system;

FIG. 2 is a block diagram showing an example of the functional arrangement of a radio transmitter;

FIG. 3 is a block diagram showing an example of the hardware arrangement of the radio transmitter;

FIG. 9 is a table showing an example of a directivity and communication quality in a communication link test;

FIG. 10 is a table showing an example of a communication link table;

FIG. 15 is a flowchart illustrating the operation procedure of a radio receiver;

FIG. 16A and FIG. 16B are tables showing an example of a communication link table.

DESCRIPTION OF THE EMBODIMENTS

Figure 4:
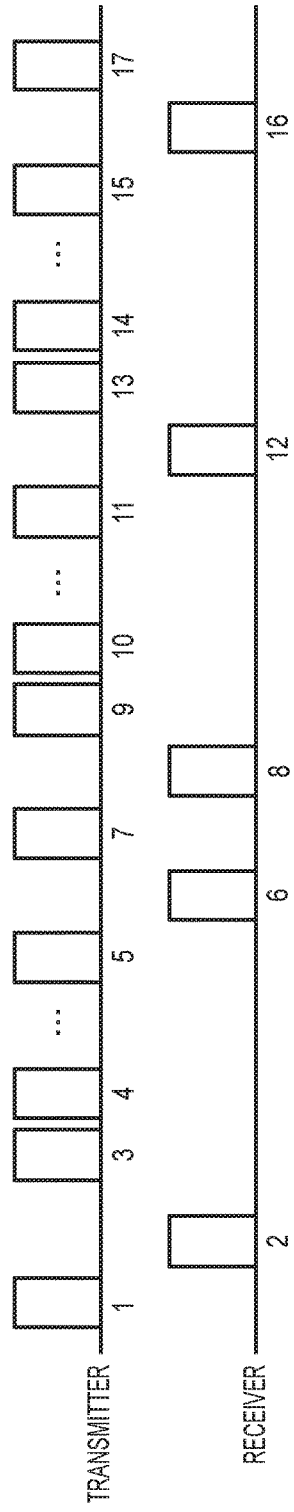
FIG. 4 is a view for explaining frames in a beam test.

Embodiments of the present invention will be described in detail below with reference to the accompanying drawings.

(Radio Communication System)

FIG. 1 is a view showing an example of the arrangement of a radio communication system according to an embodiment of the present invention. This radio communication system includes a radio transmitter (transmitter) 100, a plurality of radio receivers (receivers) 101 to 104, and a personal computer (to be referred to as a PC hereinafter) 105 as communication apparatuses according to this embodiment. Each of the radio transmitter 100 and the radio receivers 101 to 104 includes a directional antennal capable of forming a beam. The radio transmitter 100 and the radio receivers 101 to 104 are connected by a radio communication method using the directional antennas, and can use, for example, IEEE802.11ad as the radio communication method. In this embodiment, a description will be provided based on IEEE802.11ad. However, any other radio communication methods can be used as long as they use the directional antennas. The PC 105 is connected to the radio receivers 101 to 104 to perform data processing.

The radio receivers 101 to 104 and the PC 105 are connected by a wire 106 capable of transmitting a wired communication signal. Each of the radio receivers 101 to 104 transfers a received radio signal to the PC 105. This allows the PC 105 to receive the radio signal of the radio transmitter 100 from each of a plurality of paths, thereby reducing the occurrence probability of communication blockage. A communication method such as Gigabit Ethernet® can be used as a wired communication method. Communication between the PC 105 and each of the radio receivers 101 to 104 can be performed by a radio communication method such as IEEE802.11n.

In this embodiment, by making settings so that a largest number of radio receivers can receive the transmission antenna directivity of the radio transmitter 100 in radio communication, it is possible to reduce the probability of communication blockage by an obstacle, and thus improve the communication robustness.

(Radio Transmitter)

The arrangement of the radio transmitter 100 will be described next with reference to FIG. 2. FIG. 2 is a block diagram showing an example of the functional arrangement of the radio transmitter 100. An antenna 200 can form a beam in an arbitrary direction. In this embodiment, an example in which the antenna 200 is formed by a phased array antenna including a phase shifter for each antenna will be described. The antenna 200 is not limited to this, and any directional antenna can be used. For example, the antenna 200 may be formed by a switched array antenna which includes a plurality of restrained beams and can select a beam for each switch, or an antenna which includes a restrained beam and directs a beam in a specific direction by mechanically scanning the beam.

The antenna 200 includes a plurality of antenna elements, and includes, for each antenna element, a phase shifter and a digital analog converter circuit (a digital-to-analog conversion circuit to be referred to as a "DAC circuit" hereinafter) connected to the phase shifter. The phase shifter is a circuit which can change the shift amount of an output signal for an input signal by performing control using an analog voltage. The antenna 200 electrically scans a beam by causing the DAC circuit connected to the corresponding phase shifter to convert, into an analog voltage signal, a digital signal which has been output from an antenna directivity setting unit 201 and indicates a shift amount for each antenna element, and applying a voltage for each phase shifter. The antenna 200 transmits a radio packet generated by a radio signal transmission unit 202 with a directivity set by the antenna directivity setting unit 201. Furthermore, the antenna 200 receives a radio packet such as a response signal transmitted by each of the radio receivers 101 to 104 with a directivity set by the antenna directivity setting unit 201, and outputs it to a radio signal reception unit 203.

The antenna directivity setting unit 201 sets a directivity in the antenna 200. More specifically, based on a steering vector indicating the arrangement of the array antenna of the antenna 200 and a directivity angle at which the antenna 200 directs the beam, an antenna weighting vector indicating the amplitude and phase of an electrical signal to be supplied to each antenna element of the antenna 200 is calculated. For example, let a(θ) be the steering vector of the antenna, θ0 be the directivity angle of the antenna, and N be the number of antenna elements. Then, an antenna weighting vector w is given by:

$$a(\theta) = [(1 e^{-j\pi \sin \theta} e^{-j2\pi \sin \theta} e^{-j3\pi \sin \theta} \ldots e^{-j(N-1)\pi \sin \theta}]$$

$$w = [1 e^{j\pi \sin \theta_0} e^{j2\pi \sin \theta_0} e^{j3\pi \sin \theta_0} \ldots e^{j(N-1)\pi \sin \theta_0}] \quad (1)$$

The phase amount of each antenna element indicated by the antenna weighting vector w is output to the antenna 200.

The radio signal transmission unit 202 converts a test signal generated by a test signal generation unit 204, a data signal generated by a data signal generation unit 205, and a communication setting signal generated by a communication setting signal generation unit 206 into a packet format complying with IEEE802.11ad. The test signal is a sector sweep frame (to be referred to as an "SSW frame" hereinafter), a beam refinement protocol frame (to be referred to as a "BRP frame" hereinafter), or the like. The test signals are used to search for a combination of directivities with which given communication quality or more can be obtained from combinations of the transmitter antenna directivity of the radio transmitter 100 and the respective receiver antenna directivities of the radio receivers 101 to 104. The data signal is a payload data signal such as a video signal, and the communication setting signal is a signal in which communication setting information such as MAC address information for designating a destination station and an antenna directivity is described. A search (to be referred to as a "beam test" hereinafter) for a combination of directivities using the test signals will be described later.

The radio signal reception unit 203 receives an acknowledgement signal or response signal in the beam test, or a response signal for data communication, and outputs information about the reception quality to a reception quality acquisition unit 207.

The reception quality acquisition unit 207 stores information about the communication quality described in the response signal in the beam test in association with the MAC address of the radio receiver, the transmitter antenna directivity, the receiver antenna directivity, and the reception quality, and outputs the information to a destination receiver decision unit 208. At the time of data communication as well, the reception quality acquisition unit 207 acquires the reception quality in the destination station and those in radio stations other than the destination station, and outputs them to the destination receiver decision unit 208. When the destination station describes, in the response signal for data communication, the reception quality in the destination station and those in the radio stations other than the destination station, the reception quality acquisition unit 207 of the transmission station can acquire the above reception qualities.

The destination receiver decision unit 208 decides the transmitter antenna directivity, the destination station, and the receiver antenna directivity in the destination station so that a largest number of radio receivers can obtain the given communication quality, generates a signal of which the radio receivers are notified, and outputs the generated signal to the communication setting signal generation unit 206.

The communication setting signal generation unit 206 generates a signal in which the transmitter antenna directivity, the destination station, and the receiver antenna directivity in the destination station all of which have been decided by the destination receiver decision unit 208 are described, and outputs the generated signal to the radio signal transmission unit 202.

FIG. 3 is a block diagram showing an example of the hardware arrangement of the radio transmitter 100. Referring to FIG. 3, a CPU 990 is a central processing unit, and controls the overall operation of the radio transmitter 100 in cooperation with other components based on computer programs. A ROM 991 is a read only memory, and stores basic programs, and data and the like to be used for basic processing. A RAM 992 is a writable memory, and functions as a work area of the CPU 990 or the like.

An external storage drive 993 implements access to a recording medium, and can load computer programs and data stored in a medium (recording medium) 994 such as a USB memory into this system. A storage 995 is a device which functions as a large-capacity memory such as an SSD (Solid State Drive). The storage 995 stores various computer programs and data.

An operation unit 996 is a device for accepting an instruction from a user and the input of a command, and corresponds to a keyboard, a pointing device, a touch panel, or the like. A display 997 is a display device for displaying a command input from the operation unit 996, a response output to the command from an information processing apparatus, and the like. An interface (I/F) 998 is a device for relaying exchange of data with an external apparatus. The above-described antenna 200 is provided as the I/F 998. A system bus 999 is a data bus for controlling a data flow in the information processing apparatus.

The respective functional elements 201 to 208 shown in FIG. 2 are implemented by software components in this arrangement. However, some or all of these functional elements 201 to 208 may also be formed by dedicated hardware components.

(Beam Test)

A search for a combination of a transmitter antenna directivity and receiver antenna directivity between two radio sets will be described with reference to FIGS. 4 and 5. A "search for a combination of a transmitter antenna directivity and receiver antenna directivity between two radio sets" will be referred to as a "beam test" in this specification. In a beam test, the transmitter and receiver scan the antenna directivities, and searches for a plurality of combinations of transmitter and receiver antenna directivities with which given satisfactory communication quality is obtained by data communication by a main lobe. A radio station for managing a radio band in a radio communication area to which the radio transmitter 100 and the radio receivers 101 to 104 belong will be referred to as a control station hereinafter. Communication quality required as the given communication quality is that satisfying a transmission rate required by the system.

FIG. 4 is a view showing a frame number transmitted from each apparatus, the type of each frame, and transmission and reception directivities when performing a beam test. FIG. 5 is a view for explaining an antenna directivity in this radio communication system. The antenna directivity includes beam directivities 501, sector directivities 502 each including a plurality of beam directivities 501, and an omni directivity 503 including a plurality of sector directivities 502. In the example of FIG. 5, a radio set 504 includes 12 beam directivities 501, four sector directivities 502, and one omni directivity 503. As a method of implementing the beam directivities 501, sector directivities 502, and omni directivity 503 by an array antenna, there is provided a method of switching the number of antennas to be driven. However, other methods may be used as long as they can change the half-width of the directivity. A radio transmitter 505 and a radio receiver 506 can be connected by two communication links 507 and 508. For the first communication link 507, a transmission beam directivity 509 is represented by Beam=5 and a reception beam directivity 510 is represented by Beam=6. For the second communication link 508, a transmission beam directivity 511 is represented by Beam=11 and a reception beam directivity 512 is represented by Beam=2. Note that the Xth (X=1 to 12) beam directivity in the clockwise direction is represented by Beam=X in FIG. 5. The sequence of the sectors is determined in the clockwise direction in FIG. 5. An operation until the radio transmitter 505 and the radio receiver 506 discover the above two combinations of beam directivities will be described below.

First, the radio transmitter 505 requests a control station (not shown) to assign a radio band for executing a beam test. The transmission count of a test signal is given by (transmission station sector directivity count)×(reception station sector directivity count)+(beam directivity count for each transmitter sector directivity)×(beam directivity count for each receiver sector directivity)×(communication link candidate count). A radio band for executing a beam test is decided depending on the number of communication links between the radio sets.

Figure 5:
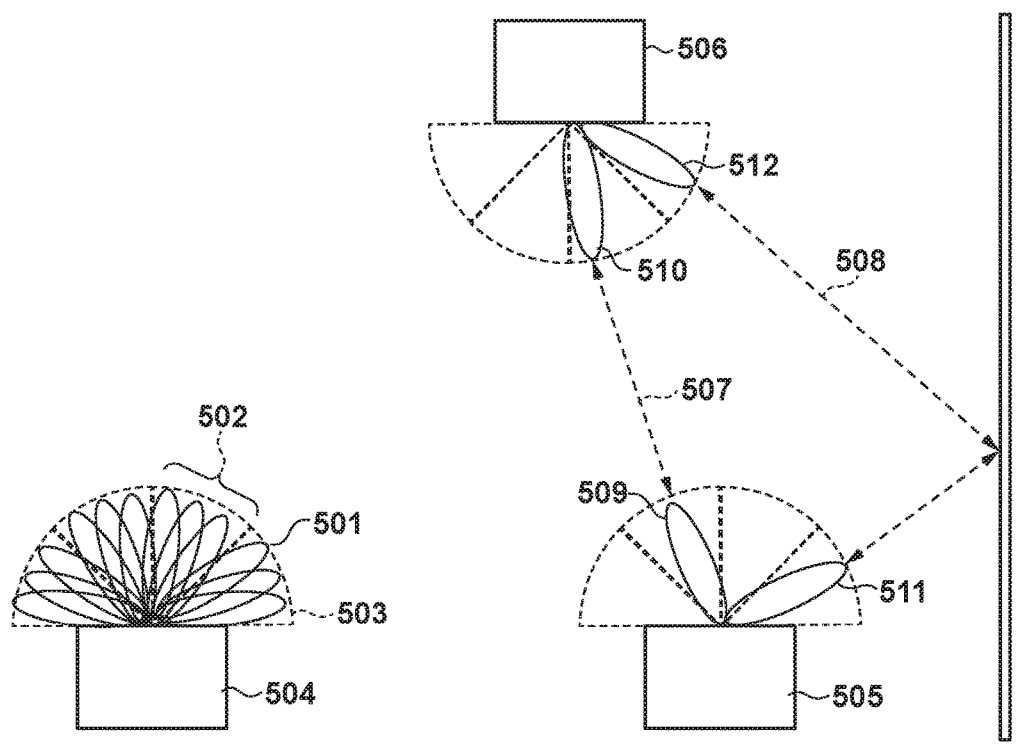
FIG. 5 is a view for explaining an antenna directivity.

For example, in the example of FIG. 5, if the transmitter sector directivity count and the receiver sector directivity count are 4, the beam directivity count for each transmitter sector directivity and that for each receiver sector directivity are 3, and the communication link candidate count is 2, the transmission count of the test signal is 34. It is thus necessary to request assignment of a radio band in which the test signal and a response signal to it can be sufficiently transmitted. The maximum transmission count of the test signal never exceeds (transmitter beam directivity count)×(receiver beam directivity count). Consequently, after the assignment of the radio band in which the test signals, the number of which is given by (transmitter beam directivity count)×(receiver beam directivity count), and response signals to them can be sufficiently transmitted, an operation may be performed to notify the control station of the release of the radio band upon end of the beam test. When the control station sends, using a notification signal such as a beacon signal, a notification of antenna arrangement information such as the beam directivity count and sector directivity count of each radio set before the start of the beam test, each radio set can acquire the antenna arrangement information of the partner radio set.

The radio transmitter 505 assigned with the radio band transmits a beam test start signal for sending a beam test start notification to the radio receiver 506 with the omni directivity in frame number 1. By describing the MAC address of the radio transmitter 505 in the beam test start signal, the radio receiver 506 can recognize the radio transmitter 505 with which the beam test is to be executed.

Upon receiving the beam test start signal, the radio receiver 506 transmits an acknowledgement signal with the omni directivity in frame number 2. Since the radio transmitter 505 and the radio receiver 506 do not recognize the positional relationship between them, the above two signals are transmitted/received with the omni directivity. To allow transmission/reception with the omni directivity, the radio transmitter 505 and the radio receiver 506 operate to improve the communication robustness by, for example, decreasing the degree of modulation and increasing the coding rate.

Upon receiving the acknowledgement signal, the radio transmitter 505 transmits SSW signals, the number of which is equal to the receiver sector directivity count, with transmitter sector directivity 1 during a period of frame number 3 to frame number 5, and repeats the same operation with each of transmitter sector directivities 2, 3, and 4. After performing a reception operation during the period of the SSW frame signals with the receiver sector directivity 1, and then repeating the same operation with each of receiver sector directivities 2, 3, and 4, the radio receiver 506 switches the directivity to receiver sector directivity 1 again to repeat the same operation. The radio receiver 506 records, for example, a signal-to-noise ratio (to be referred to as an "SNR" hereinafter) as the reception quality of each SSW frame together with a reception timing. Any information can be recorded as the reception quality as long as the quality of the signal transmitted by the radio transmitter 505 can be inspected. For example, during the period of frame number 3 to frame number 5 of the SSW frames, the purpose is to test the communication quality with all the combinations of the transmitter sector directivities and receiver sector directivities. Thus, a method of fixing the transmitter antenna directivity and switching the receiver antenna directivity, as needed, as described above, or a method of switching the transmitter antenna directivity, as needed, and fixing the reception antenna directivity may be adopted.

In frame number 6, the radio receiver 506 describes the reception quality result of each SSW frame in a response signal, and transmits the response signal with the omni directivity. The reception quality result to be transmitted may include the reception quality results of all the SSW signals, the receiver sector directivities, and the reception timings, or the reception quality result which is determined to be equal to or higher than the given communication quality based on the SNR, the receiver sector directivity, and the reception timing. In this example, when the transmitter sector directivity is 2 and the receiver sector directivity is 2 and when the transmitter sector directivity is 4 and the receiver sector directivity is 1, the reception qualities are equal to or higher than the given communication quality. Therefore, the reception timings of the above antenna settings and the SNRs are described in the response signal.

In frame number 7, the radio transmitter 505 describes an order for testing the combinations of transmitter beam directivities and receiver beam directivities in a BRP setup signal, and transmits the BRP setup signal to the radio receiver 506 with the omni directivity. In this example, first, combinations of transmitter beam directivities belonging to transmitter sector directivity 2 and receiver beam directivities belonging to receiver sector directivity 2 are tested. Next, combinations of transmitter beam directivities belonging to transmitter sector directivity 4 and receiver beam directivities belonging to receiver sector directivity 1 are tested.

In frame number 8, when a reception station transmits an acknowledgement signal with the omni directivity in response to the BRP setup signal, the radio transmitter 505 and the radio receiver 506 can share the order for testing the combinations of the transmitter beam directivities and receiver beam directivities.

Upon receiving the acknowledgement signal, the radio transmitter 505 transmits BRP signals, the number of which is equal to the number of receiver beam directivities belonging to the receiver sector directivity, with transmitter beam directivity 4 during a period of frame number 9 to frame number 11. Next, the radio transmitter 505 repeats the same operation with each of transmitter beam directivities 5 and 6 the number of times which is equal to the number of transmitter beam directivities belonging to the transmitter sector directivity. After performing a reception operation during the period of the BRP frame signals with receiver beam directivity 4, the radio receiver 506 repeats the same operation with each of receiver beam directivities 5 and 6 the number of times which is equal to the number of receiver beam directivities belonging to the receiver sector directivity. After that, the radio receiver 506 switches the directivity to receiver beam directivity 4 again to repeat the same operation. Any signal capable of measuring the reception quality in the combination of transmitter and receiver beam directivities is used as the BRP signal. For example, the BRP signal may include a known signal sequence, and an SNR when a square error minimization reference is applied to a weighting vector may be measured as the reception quality.

The radio receiver 506 records the reception quality of each BRP frame together with the reception timing. During the period of frame number 9 to frame number 11, the purpose is to test the communication quality with all the combinations of transmitter beam directivities in a specific transmitter sector directivity and receiver beam directivities in a specific receiver sector directivity. Thus, a method of fixing the transmitter antenna directivity and switching the receiver antenna directivity, as needed, as described above, or a method of switching the transmitter antenna directivity, as needed, and fixing the receiver antenna directivity may be used.

In frame number 12, the radio receiver 506 describes the reception quality result of each BRP frame in a response signal, and transmits the response signal with the omni directivity. The reception quality result may include the reception quality results of all the BRP signals, the receiver beam directivities, and the reception timings, or a reception quality result which is determined to be equal to or higher than the given communication quality based on the SNR, the receiver beam directivity, and the reception timing. In this example, when the transmitter beam directivity is 5 and the receiver beam directivity is 6, the reception quality is equal to or higher than the given communication quality. Therefore, the reception timing of the above antenna settings and the SNR are described in the response signal. Furthermore, if the given communication quality is also obtained with the adjacent directivity beam, the reception timing of the above antenna settings and the SNR are described in the response signal.

Upon receiving the response signal, the radio transmitter 505 tests the combinations of transmitter beam directivities belonging to transmitter sector directivity 4 and receiver beam directivities belonging to receiver sector directivity 1 during a period of frame number 13 to frame number 15.

The same operation as that during the period of frame number 9 to frame number 12 is executed during the period of frame number 13 to frame number 15. With this operation, a combination of transmitter beam directivity 11 existing in transmitter sector directivity 4 and receiver beam directivity 2 existing in receiver sector directivity 1 can be discovered as a communication link in which the given communication quality is obtained.

In frame number 17, the radio transmitter 505 transmits a beam test result signal to the radio receiver 506, thereby completing the beam test.

As described above, in a beam test, for each of the plurality of receivers, by setting the receiver as a partner receiver, a transmitter antenna directivity with which it is possible to transmit a test signal to the partner receiver by communication by a main lobe is determined. More specifically, a transmitter antenna directivity with which it is possible to transmit a test signal at reception quality equal to or higher than a predetermined threshold is determined. This can determine a transmitter antenna directivity with which communication can be implemented by communication by the main lobe.

(Radio Receiver)

The arrangement of each of the radio receivers 101 to 104 will be described next with reference to FIG. 6. The hardware arrangement of an antenna 300 is the same as that of the antenna 200 of the radio transmitter 100. The antenna 300 transmits a radio packet generated by a radio signal transmission unit 302 with a directivity set by an antenna directivity setting unit 301. Furthermore, the antenna 300 receives, with a directivity set by the antenna directivity setting unit 301, a radio packet transmitted by the radio transmitter 100, and outputs the radio packet to a radio signal reception unit 303.

The hardware arrangement of the antenna directivity setting unit 301 is the same as that of the antenna directivity setting unit 201 of the radio transmitter 100, and the antenna directivity setting unit 301 sets a directivity in the antenna 300. More specifically, based on a steering vector indicating the arrangement of the array antenna of the antenna 300 and a directivity angle at which the antenna 300 directs a beam, an antenna weighting vector indicating the amplitude and phase of an electrical signal to be supplied to each antenna element of the antenna 300 is calculated. The antenna directivity is switched at one of the timing when the radio signal transmission unit 302 finishes generation of a radio packet, the timing when a communication setting signal acquisition unit 304 acquires directivity switching information and destination station switching information from the radio transmitter 100, and the timing when the radio transmitter 100 performs a beam test and data communication with another radio receiver, which is acquired by a communication timing acquisition unit 308.

The radio signal transmission unit 302 converts a response signal generated by a response signal generation unit 307 into the packet format complying with IEEE802.11ad. The radio signal reception unit 303 receives a communication setting signal, the test signal in the above-described beam test, or a data signal, and outputs it to the communication setting signal acquisition unit 304, a reception quality measurement unit 305, or a data signal transfer unit 309.

Based on the communication setting signal received by the radio signal reception unit 303, the communication setting signal acquisition unit 304 acquires information indicating whether the self station is a destination reception station. The communication setting signal acquisition unit 304 operates to perform data reception with the designated receiver antenna directivity if the self station is a destination reception station, and to perform data reception with an arbitrary radio receiver antenna directivity and detection of a radio signal if the self station is not a destination station.

The communication timing acquisition unit 308 acquires, via a wired I/F unit 310, a timing at which a beam test is executed in another radio receiver and a timing at which the radio transmitter executes data transmission if the self station is not a destination reception station.

The reception quality measurement unit 305 measures the reception quality at which the test signal and the data signal are received, and outputs the measured reception quality to the wired I/F unit 310, a reception quality acquisition unit 306, and a response signal generation unit 307. Reception quality information in another radio receiver is described in a response signal in addition to the reception quality in the self station. All the radio receivers 101 to 104 share their pieces of reception quality information via the wired I/F unit 310, and feed back the information including other receiver information to the radio transmitter 100. With this processing, if the radio transmitter 100 can receive the feedback information from one of the radio receivers, it can acquire the pieces of reception quality information of all the radio receivers, thereby improving the communication robustness.

The reception quality acquisition unit 306 acquires the reception quality information of the self station from the reception quality measurement unit 305, and shares the reception quality information with another radio receiver via the wired I/F unit 310. The response signal generation unit 307 generates a response signal to the beam test and a response signal to the data signal, and converts the signals into the packet format complying with the IEEE802.11ad. If the self station is designated as a destination reception station, the data signal transfer unit 309 outputs the received data signal to the wired I/F unit 310 to transfer it to the PC 105.

The wired I/F unit 310 is connected to another radio receiver by a wire to share the reception timings of the reception quality information and the test signal or data signal. The wired I/F unit 310 is also connected to the PC 105 by a wire to transfer reception data to the PC 105 directly or via the other radio receiver.

Note that FIG. 3 shows the hardware arrangement of each of the radio receivers 101 to 104, similarly to the radio transmitter 100.

(Operation of Radio Communication System)

Figure 7:
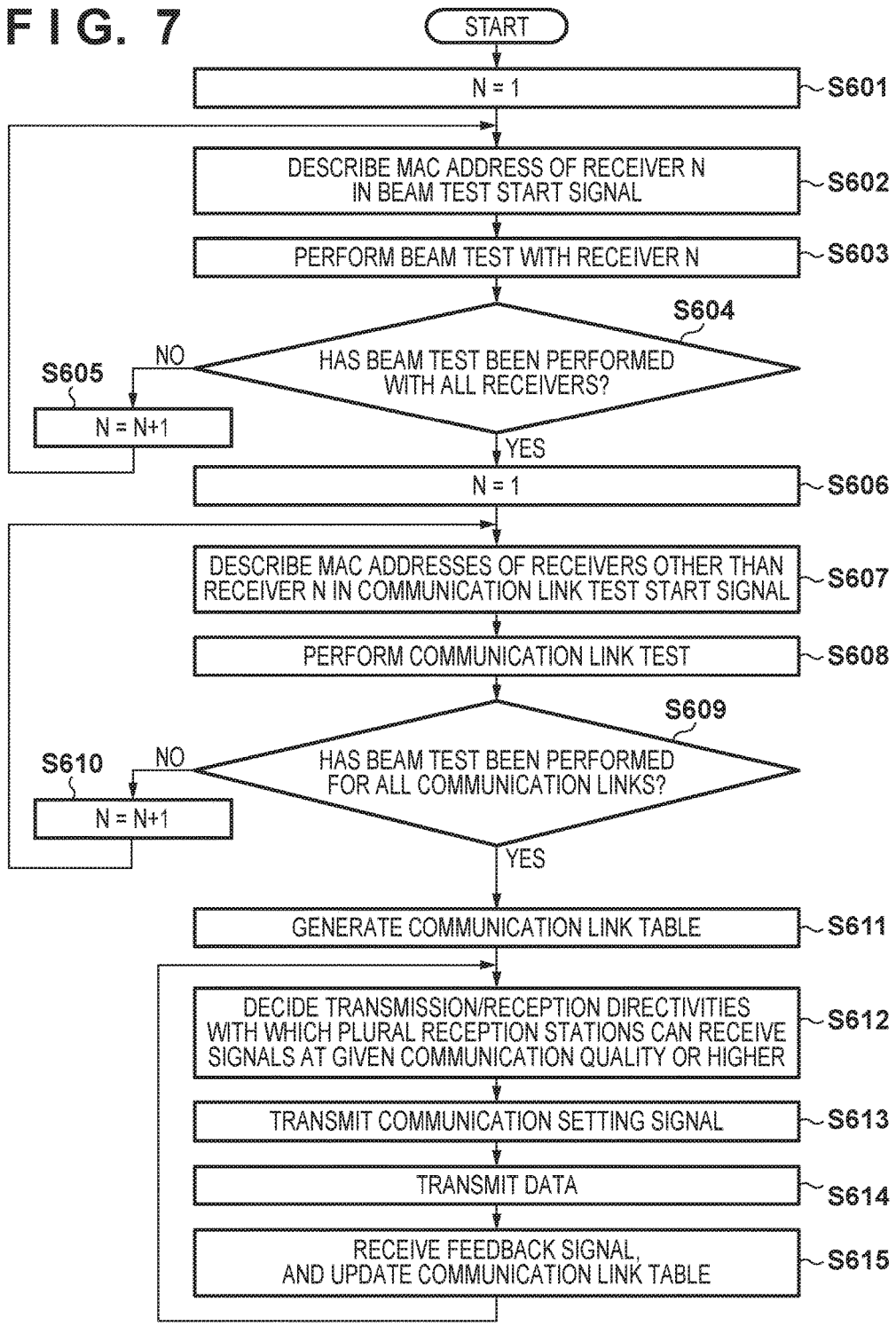
FIG. 7 is a flowchart illustrating the operation procedure of the radio transmitter.
Figure 8:
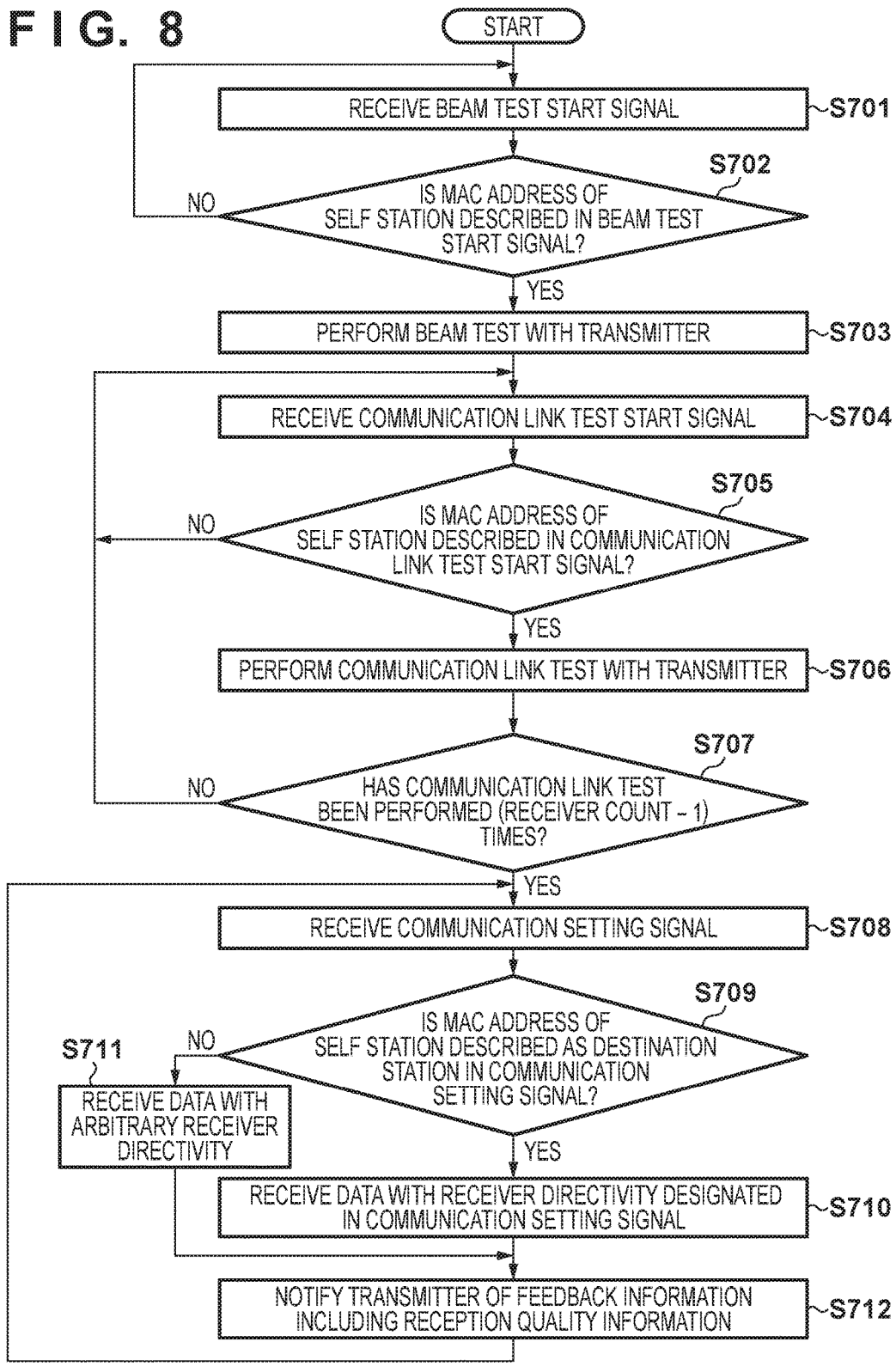
FIG. 8 is a flowchart illustrating the operation procedure of the radio receiver.

The operations of the radio transmitter 100 and each of the radio receivers 101 to 104 of the radio communication system according to this embodiment will be described with reference to FIGS. 7 and 8. FIG. 7 is a flowchart illustrating the operation procedure of the radio transmitter 100, and FIG. 8 is a flowchart illustrating the operation procedure of each of the radio receivers 101 to 104. Each step of FIG. 7 is executed under the control of the CPU (central processing unit) 990 of the radio transmitter 100, and each step of FIG. 8 is executed under the control of the CPU 990 of each of the radio receivers 101 to 104.

The radio transmitter 100 and each of the radio receivers 101 to 104 perform a beam test in steps S601 to S605 and S701 to S703. As described above, in the beam test, for each receiver, directivities on the transmission and reception sides with which given reception quality is obtained when transmitting a test signal to the receiver by a main lobe are determined. In step S601, the radio transmitter 100 sets a value of 1 in parameter N. In step S602, the radio transmitter 100 describes the MAC address of radio receiver N (in this example, N=1) in the receiver MAC address of a beam test start signal, thereby performing radio transmission. The process advances to step S603.

In response to this, in step S701, the radio receiver receives the beam test start signal. In step S702, the radio receiver determines whether the MAC address of the self station is described in the receiver MAC address of the beam test start signal. If the MAC address of the self station is not described (NO in step S702), the radio receiver transfers the beam test start signal to another reception station via the wired I/F, or does nothing to return to step S701. A radio receiver whose MAC address is described will be referred to as a partner receiver hereinafter. If the MAC address of the self station is described (YES in step S702), the process advances to step S703.

In steps S603 and S703, the radio transmitter 100 and the partner receiver perform the beam test, and detects a communication link in which the given communication quality is obtained. The beam test is completed when the partner receiver notifies the radio transmitter 100 of a beam test result. It is determined in step S604 whether the beam test has been performed with all the radio receivers. If the beam test has been performed with all the radio receivers (YES in step S604), the radio transmitter 100 advances to step S606; otherwise (NO in step S604), the process advances to step S605 to select the next radio receiver as a partner receiver and perform the beam test. That is, N is incremented by 1 (N=N+1), and the radio transmitter 100 performs the beam test with radio receiver N in steps S602 and S603. On the other hand, if the beam test ends, the radio receiver advances to step S704.

An example in which, as a result of the beam test, the following three communication links are detected as (transmitter antenna directivity, receiver antenna directivity, SNR) between the radio transmitter 100 and the radio receiver 101 will be described.

(Transmitter directivity Beam=4, receiver directivity Beam=5, SNR=50)

(Transmitter directivity Beam=5, receiver directivity Beam=6, SNR=40)

(Transmitter directivity Beam=11, receiver directivity Beam=8, SNR=20)

Similarly, assume that, as a result of the beam test, the following three communication links are detected between the radio transmitter 100 and the radio receiver 102.

(Transmitter directivity Beam=3, receiver directivity Beam=4, SNR=20)

(Transmitter directivity Beam=4, receiver directivity Beam=5, SNR=20)

(Transmitter directivity Beam=12, receiver directivity Beam=6, SNR=50)

Similarly, assume that, as a result of the beam test, the following three communication links are detected between the radio transmitter 100 and the radio receiver 103.

(Transmitter directivity Beam=17, receiver directivity Beam=6, SNR=30)

(Transmitter directivity Beam=18, receiver directivity Beam=5, SNR=40)

(Transmitter directivity Beam=19, receiver directivity Beam=8, SNR=40)

Similarly, assume that, as a result of the beam test, the following three communication links are detected between the radio transmitter 100 and the radio receiver 104.

(Transmitter directivity Beam=5, receiver directivity Beam=1, SNR=30)

(Transmitter directivity Beam=23, receiver directivity Beam=5, SNR=50)

(Transmitter directivity Beam=24, receiver directivity Beam=7, SNR=40)

Note that in FIG. 1, the radio transmitter 100 can take 24 transmitter antenna directivities, and each of the radio receivers 101 to 104 can take 8 receiver antenna directivities. From a given direction, the Xtxth (Xtx=1 to 24) transmitter antenna directivity is represented by the transmitter directivity Beam=Xtx, and the Xrxth (Xrx=1 to 8) receiver antenna directivity is represented by the receiver directivity Beam=Xrx.

In steps S606 to S610 and S704 to S707, a communication link test is performed. In the communication link test, a test signal is transmitted with the transmitter antenna directivity which has been detected in the beam test and with which the given communication quality is obtained, and it is then determined whether another radio receiver can receive the test signal. That is, if a test signal is transmitted with the transmitter antenna directivity obtained in the beam test for each receiver, it is inspected whether another receiver can receive the signal by communication by a side lobe. A radio receiver for which it is inspected whether it can receive the signal will be referred to as a monitor receiver hereinafter.

In step S606, the radio transmitter 100 sets a value of 1 in parameter N. In step S607, the radio transmitter 100 transmits a communication link test start signal in which the MAC addresses of the receivers (that is, monitor receivers) other than receiver N are described as receiver MAC addresses. More specifically, the following information is described in the communication link test start signal.

The start timing of test signal transmission with the omni directivity

Duration period of one test signal

Test signal transmission count

The MAC addresses of the radio receivers 102 to 104 as monitor receivers After transmitting the communication link test start signal, the process advances to step S608.

On the other hand, although the radio receiver receives the communication link test start signal in step S704, the radio transmitter 100 performs this operation, and thus each of all the radio receivers maintains a reception state with the receiver antenna directivity with which the best reception quality is obtained until the radio receiver can receive the above-described radio signal. Upon receiving the above-described radio signal, the radio receiver transfers the above-described radio signal as a wired signal to another radio receiver using the wired I/F unit. With this processing, each of all the radio receivers 101 to 104 acquires the communication link test start signal including the test signal transmission timing of the radio transmitter 100.

In step S705, the radio receiver determines whether the MAC address of the self station is described in the communication link test start signal. If the MAC address of the self station is described (YES in step S705), the self station is a monitor receiver, and thus the process advances to step S706; otherwise (NO in step S705), the process returns to step S704.

In steps S608 and S706, a communication link test is performed. In the communication link test, for each of the transmitter antenna directivities determined in the beam test, if a test signal is transmitted with the transmitter antenna directivity, a receiver capable of receiving the test signal by the side lobe appended to the main lobe is determined as a monitor receiver. More specifically, a transmitter antenna directivity with which the test signal can be transmitted at reception quality equal to or higher than a predetermined threshold is determined. FIG. 9 is a table showing examples of the radio transmitter antenna directivity, the receiver antenna directivity of the monitor receiver, and a reception result in the communication link test. The radio transmitter 100 performs transmission with the transmitter antenna directivity Beam=4 with which the given communication quality is obtained with the radio receiver 101. Each of the radio receivers 102 to 104 operates to receive the signal from the radio transmitter 100 with a receiver antenna directivity with which the given communication quality is obtained with the radio transmitter 100. More specifically, each monitor receiver receives the signal with the receiver antenna directivity which has been detected in the beam test and with which the given communication quality is obtained with the radio transmitter 100.

In a beam formation method by an array antenna, there exists a side lobe in which an electromagnetic wave is concentratedly radiated in addition to the direction in which the main beam is directed. It is generally known that the strengths, ranges, and number of side lobes are largely different depending on the angle at which the main beam is directed and the antenna implementation form. Each monitor receiver can receive the signal when the side lobe is directed to the radio receiver, by performing a reception operation with the receiver antenna directivity which has been detected in the beam test and with which the given communication quality is obtained with the radio transmitter 100. Note that the monitor receiver need not inspect for all the receiver antenna directivities whether the self station can receive the signal when the radio transmitter 100 directs the beam to another radio receiver, and inspection with the receiver antenna directivity detected in the beam test is enough.

A period during which the radio transmitter 100 continuously transmits the test signal corresponds to "Duration period of one test signal×detected communication link count". Each of the radio receivers 102 to 104 operates to receive the signal from the radio transmitter 100 by switching the radio receiver antenna directivity to another one every time the Duration period elapses. Every time the receiver antenna directivity is switched, each monitor receiver records the reception signal quality. The measured SNR is recorded as reception quality information. If no signal can be detected, SNR=0 is recorded.

Upon end of test signal transmission with the transmitter antenna directivity Beam=4, the radio transmitter 100 transmits the test signal with a transmitter antenna directivity other than the transmitter antenna directivity Beam=4 with which the given communication quality is obtained with the radio receiver 101. In this example, the radio transmitter 100 transmits the test signal with the transmitter antenna directivity Beam=5. Similarly to the above operation, each of the radio receivers 102 to 104 performs reception by switching the receiver antenna directivity, and records the reception quality, as needed. After the end of the transmission of the test signal with the transmitter antenna directivity with which the given communication quality is obtained with the radio receiver 101, and the measurement, each of the radio receivers 102 to 104 transmits a response signal to the radio transmitter 100.

Since the radio transmitter 100 receives the response signal after the test signal transmission, it needs to switch the state to a reception state after the test signal transmission. The radio transmitter 100 cannot know which of the radio receivers 102 to 104 transmits the response signal. Therefore, the radio transmitter 100 operates so as to receive a radio signal from any direction by setting, as the reception directivity, the omni directivity which is the widest directivity or circulating the transmitter antenna directivity in every predetermined cycle. The radio receivers 102 to 104 may acquire the reception result of one another via the wired I/F, and one of the radio receivers may transmit the response signal. Upon completion of the communication link test in step S608, the radio transmitter 100 advances to step S609. Upon completion of the communication link test in step S706, the radio receiver advances to step S707.

In step S609, the radio transmitter 100 determines whether the communication link test has been performed for all the communication links. If the communication link test has been performed for all the communication links (YES in step S609), the process advances to step S611; otherwise (NO in step S609), the process advances to step S610 to increment N by 1 (N=N+1), and then returns to step S607 to perform the communication link test for the remaining communication links.

In step S707, it is determined whether the radio receiver has performed the communication link test (receiver count—1) times. Since there is one communication link test in which the self station is excluded, it is determined based on the execution count of the communication link test whether the communication link test is complete. If the communication link test is complete, the process advances to step S708; otherwise, the process returns to step S704.

If a transmitter antenna directivity with which a plurality of receivers can receive the signals can be discovered by the communication link tests, the transmitter antenna directivity is selected to execute radio data communication in steps S611 to S615 and S708 to S712. More specifically, data transmission and reception directivities with which the transmission efficiency is highest for overall one-to-many communication is determined based on the reception quality by the main lobe and that by the side lobe, and then radio data communication is executed with the directivities.

Figure 11:
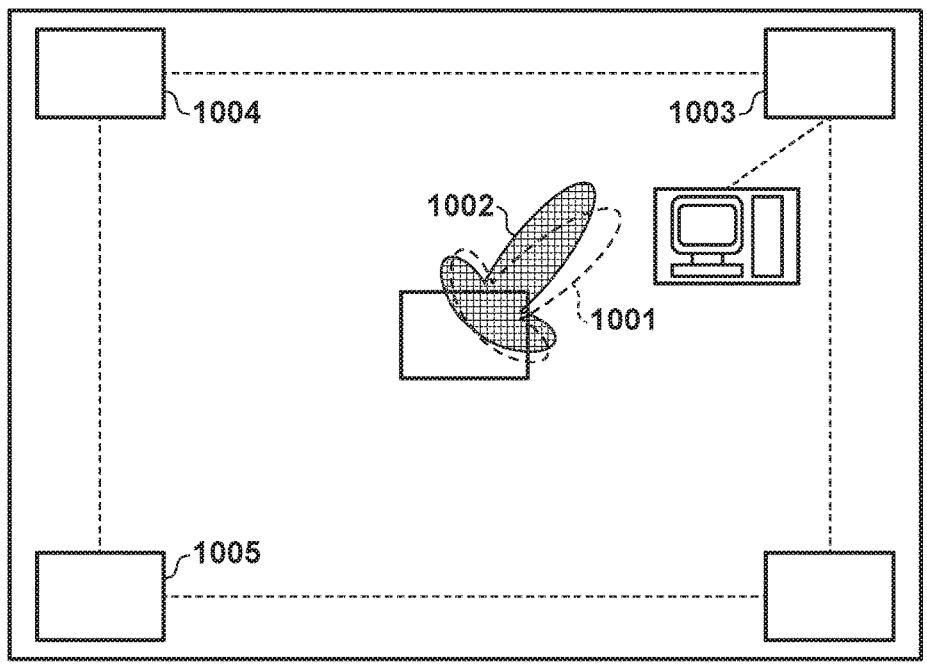
FIG. 11 is a view showing a transmitter antenna directivity.

In step S611, a table storing the measured reception quality of each radio receiver is created as a communication link table shown in FIG. 10. Referring to FIG. 10, reference numeral 910 denotes identification information of a receiver; 911, a transmitter antenna directivity; 912, a receiver antenna directivity of the receiver identified by the identification information 910; 913, an SNR (Signal-to-Noise Ratio) of the signal of the main lobe which has been received with the receiver antenna directivity 912 by the receiver identified by the identification information 910 and sent with the transmitter antenna directivity 911; 914, identification information of a receiver other than the receiver of the identification information 910; 915, a receiver antenna directivity of the receiver identified by the identification information 914; and 916, an SNR of the signal of the side lobe which has been received with the receiver antenna directivity 912 by the receiver identified by the identification information 914 and sent with the transmitter antenna directivity 911. In FIG. 10, the results denoted by reference numerals 910 to 913 are acquired in the beam test (steps S601 to S605 and S701 to S703), and the results denoted by reference numerals 914 to 916 are acquired in the communication link test (steps S606 to S610 and S704 to S707). FIG. 11 is a view showing a selected transmitter directivity according to this embodiment. Referring to FIG. 10, for example, a row 901 of the communication link table indicates a case in which when (transmitter antenna directivity Beam=4 (1001)),
(radio receiver 1 (1003), receiver antenna directivity Beam=5), and
(radio receiver 3 (1005), receiver antenna directivity Beam=6),
SNR=50 dB of communication by the main lobe in radio receiver 1 (1003), and
SNR=10 dB of communication by the side lobe in radio receiver 3 (1005) are obtained.
A row 902 indicates a case in which when
(transmitter antenna directivity Beam=5 (1002)),
(radio receiver 1 (1003), receiver antenna directivity Beam=6), and
(radio receiver 2 (1004), receiver antenna directivity Beam=4),
SNR=40 dB of communication by the main lobe in radio receiver 1 (1003), and
SNR=30 dB of communication by the side lobe in radio receiver 2 (1004) are obtained.

In step S612, based on the communication link table, a transmitter antenna directivity, a partner receiver, a receiver antenna directivity in each monitor receiver, and a communication schedule with which a plurality of radio receivers can receive signals at the given communication quality or higher are decided. A selection criterion for a transmission antenna directivity is that "a plurality of radio receivers can simultaneously receive signals at the given communication quality or higher".

As a comparison criterion, for example, the total values of SNRs in the respective radio receivers may be compared. In this case, since 50+10=60 dB in the row 901 and 40+30=70 dB in the row 902, the transmission antenna directivity in the row 902 is selected. Alternatively, the numbers of radio receivers which obtain the given communication quality or higher may be compared. If a required SNR is set to 25 dB or more, radio receiver 1, that is, one radio receiver is obtained in the row 901, and radio receivers 1 and 2, that is, two radio receivers are obtained in the row 902, thereby selecting the transmission antenna directivity in the row 902. That is, if determination is performed based on only the reception quality of radio receiver 1 (1003), the row 901 will be selected. However, since another radio receiver can receive the signal in addition to radio receiver 1 (1003), the transmission antenna directivity and communication settings in the row 902, which are resistant to blockage of an obstacle or the like, may be selected. In this way, the radio transmitter 100 selects radio receivers 1 and 2 as destination stations during a data transmission period (to be described later). In summary, the following conditions in the row 902 are selected as communication settings.

(Transmitter directivity Beam=5 (1002))
(Destination station: radio receiver 1 (1003), radio receiver 2 (1004))
(Radio receiver 1 (1003), receiver antenna directivity Beam=6)
(Radio receiver 2 (1004), receiver antenna directivity Beam=4)

If a plurality of radio receivers cannot simultaneously receive signals by selecting any transmitter antenna directivity and receiver antenna directivity, the transmission rate and the required SNR are decreased by changing the coding rate and the degree of modulation, and a larger number of radio receivers operate to receive signals. For example, conditions of "transmission rate=2.5 Gbps and receiver count=2" or "transmission rate=1.5 Gbps and receiver count=3" are preferentially selected over conditions of "transmission rate=4 Gbps and receiver count=1". That is, communication settings are decided so that the value of "transmission rate×receiver count" becomes largest.

In step S613, the radio transmitter 100 transmits, to the radio receiver, a communication setting signal in which the transmitter antenna directivity, the destination station, the receiver antenna directivity of the radio receiver as the destination station, the transmission timing, and the coding rate/the degree of modulation are described. In step S708, the radio receiver performs a reception operation. The communication setting signal is transmitted while the beam is directed to one of the radio receivers 101 to 104. Upon receiving the signal, the radio receiver transfers the signal to another radio receiver via the wired I/F, and thus all the radio receivers can acquire the communication setting signal. If there is a free time slot in time division multiplexing communication, a test signal is transmitted after a data signal. In this case, the Duration period of the test signal, the number of test signals, the transmitter antenna directivity in each test signal, the MAC address of the radio receiver, the receiver antenna directivity of each radio receiver, and the like are described in the communication setting signal.

Upon receiving the communication setting signal in step S708, the radio receiver determines in step S709 whether the self station is designated as the destination station in the communication setting signal. If the self station is designated as the destination station (YES in step S709), the process advances to step S710 to perform a reception operation with the receiver antenna directivity designated in the communication setting signal, and measure the reception signal quality; otherwise (NO in step S709), the process advances to step S711 to perform a reception operation with an arbitrary directivity and measure the reception signal quality. The communication state changes in accordance with a change in positional relationship between the radio transmitter and the radio receiver and the presence/absence of an obstacle between the radio transmitter and the radio receiver. Consequently, when a plurality of radio receivers perform observation all the time, the probability that the given communication quality is maintained can be improved. The receiver antenna directivity may be the directivity detected in the beam test or an arbitrary directivity. However, if the radio receiver performs a reception operation with an arbitrary directivity, it operates to cover all the radio receiver antenna directivities during a plurality of data transmission periods.

In step S614, the radio transmitter 100 transmits data in accordance with the timing and transmitter antenna directivity which have been described in the communication setting signal in step S613. If a test signal is transmitted, the test signal is transmitted after transmission of a data signal.

In step S712, the radio receiver shares the reception quality information measured in step S710 or S711 among the radio receivers 101 to 104 via the wired I/F unit 310. The radio receiver generates a wired signal in which the MAC address of the self station, the reception signal quality, and the receiver antenna directivity are described, and shares the signal via the wired I/F. A radio signal in which the reception quality information of each radio receiver is described is generated as a feedback signal, and undergoes radio transmission to the radio transmitter 100. In the radio signal, the MAC address, reception signal quality, receiver antenna directivity, and reception signal timing of each radio receiver are described. If all the radio receivers transmit the radio signals at the same timing, the radio signals collide with each other in the radio transmitter 100. To cope with this, it is necessary to perform arbitration between the radio receivers. The radio receivers may arbitrate and assign transmission timings using wired signals. For example, only the radio receiver which has obtained the highest reception quality in step S710 or S711 may transmit the radio signal.

In step S615, the radio transmitter 100 receives the feedback signal. Note that the radio transmitter 100 cannot know which of the radio receivers transmits the feedback signal. Therefore, the radio transmitter 100 operates to receive the feedback signal from any radio receiver. For example, the radio transmitter performs a reception operation with the wide omni directivity which covers the plurality of radio receivers, or performs an operation of, for example, circulating the transmitter antenna directivity in the direction of each radio receiver. Based on the feedback information, the radio transmitter 100 updates the communication link table. More specifically, if a combination of a transmitter antenna directivity, a destination station, the receiver antenna directivity of the radio receiver serving as the destination station, with which communication quality higher than the current one is obtained, can be discovered, the communication link table generated in step S611 is updated. Then, a new communication setting signal is generated to send a notification to each radio receiver in step S612. As described above, in this embodiment, the communication quality is observed all the time to modify the transmission and reception directivities, the destination station, and the like, as needed. Consequently, before a communication path is blocked by an obstacle or a communication error occurs due to degradation in reception quality or the like caused by a change in communication environment along with movement of a radio set, it is possible to switch the settings to a combination of a transmitter directivity, a destination station, and the receiver directivity of the destination station, which is more suitable for radio communication.

As described above, in this embodiment, a communication apparatus for transmitting data using a directional antenna performs tests of two stages as follows.

For each of a plurality of receivers, by setting the receiver as a partner receiver, a transmitter antenna directivity with which it is possible to transmit a test signal to the partner receiver by communication by a main lobe is determined (beam test).

For each of the transmitter antenna directivities determined in the beam test, if a test signal is transmitted with the transmitter antenna directivity, a receiver capable of receiving the test signal by the side lobe appended to the main lobe is determined as a monitor receiver (communication link test).

Then, data is transmitted by deciding the following settings based on the reception quality of communication by the main lobe with respect to the partner receiver and the reception quality in the monitor receiver of communication by the side lobe appended to the main lobe.

A transmitter antenna directivity to be used to transmit the data

The partner receiver and monitor receiver as data reception targets

As described

As described above, in the arrangement of this embodiment, a communication apparatus selects a transmitter directivity so that a plurality of receivers can simultaneously receive radio signals, and the receivers which have received radio signals transfer the signals to a communication processing apparatus as a final common destination apparatus. Since this allows the transmitter to transfer data to the communication processing apparatus through the plurality of receivers, it is possible to maintain the communication efficiency while improving the robustness against a change in communication environment.

Note that if the reception qualities of the monitor receivers are lower than a predetermined threshold, a transmitter antenna directivity and a partner receiver and monitor receiver as data reception targets may be decided based on only the reception quality of communication by the main lobe with respect to the partner receiver. This allows efficient and robust communication by effectively using communication by the main lobe even when communication by the side lobe is difficult.

In the above-described embodiment, an arrangement of performing radio communication with a transmitter antenna directivity with which a plurality of radio receivers can receive signals has been explained. In another embodiment of the present invention, an arrangement of performing radio communication by synthesizing a plurality of transmitter antenna directivities so that a plurality of radio receivers can receive signals will be described. Since it is possible to direct a beam at a plurality of designated angles by synthesizing a plurality of transmitter antenna directivities, it is possible to obtain higher reception qualities in the plurality of radio receivers, as compared with the arrangement of the above-described embodiment.

The arrangements and operations of a radio transmitter 100 and each of radio receivers 101 to 104 according to this embodiment will be described below with reference to the accompanying drawings. The same reference numerals as in the above-described embodiment denote the same components and operations and a detailed description thereof will be omitted.

(Radio Transmitter)

Figure 12:
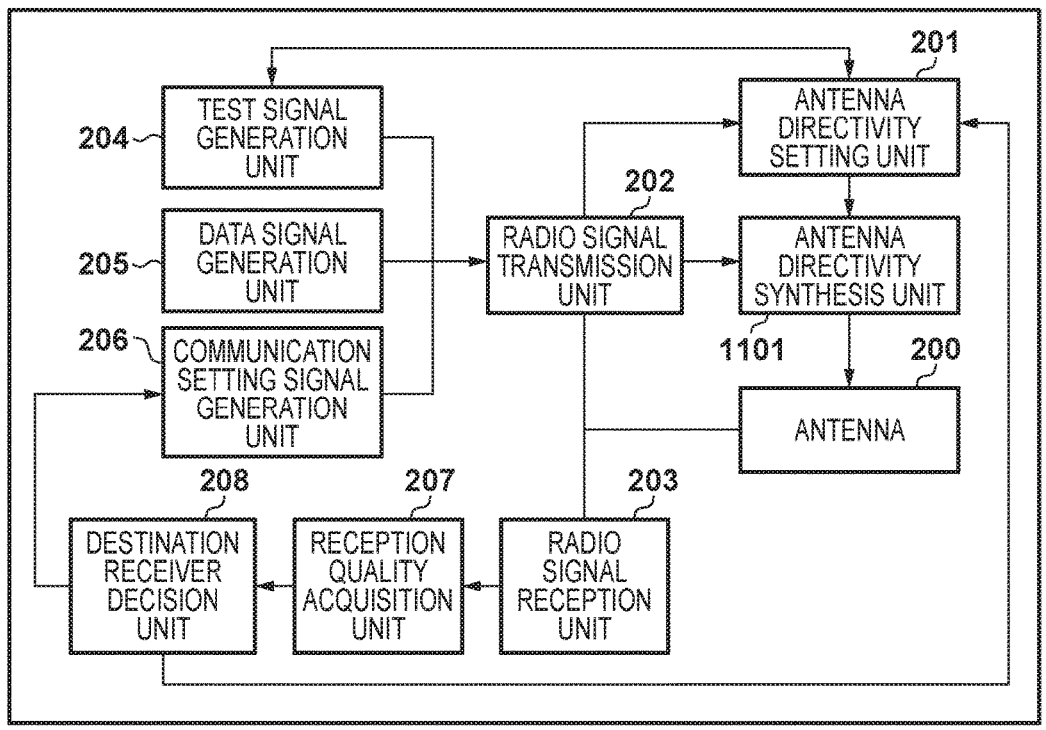
FIG. 12 is a block diagram showing an example of the functional arrangement of a radio transmitter.

FIG. 12 is a block diagram showing an example of the arrangement of the functional blocks of the radio transmitter 100 according to this embodiment. As compared with the above-described embodiment, the radio transmitter 100 of this embodiment further includes a directivity synthesis unit 1101. The directivity synthesis unit 1101 outputs, to an antenna 200, a weighting vector having equal directivity gains for a plurality of antenna directivity angles designated by an antenna directivity setting unit 201, thereby forming a multi-beam. When, for example, $a(\theta)$ represents a steering vector, and $\theta 0$ and $\theta 1$ respectively represent angles at which the antenna is directed, a weighting vector w satisfies:

$$a(\theta) = [1e^{-j\pi\sin\theta}e^{-j2\pi\sin\theta}e^{-j3\pi\sin\theta} \ldots e^{-j(N-1)\pi\sin\theta}] \quad (2)$$

$$\begin{bmatrix} 1e^{-j\pi\sin\theta_0}e^{-j2\pi\sin\theta_0} \ldots e^{-j(N-1)\pi\sin\theta_0} \\ 1e^{-j\pi\sin\theta_1}e^{-j2\pi\sin\theta_1} \ldots e^{-j(N-1)\pi\sin\theta_1} \end{bmatrix} \begin{pmatrix} w_0 \\ w_1 \\ \vdots \\ w_{N-1} \end{pmatrix} = \begin{bmatrix} N \\ N \end{bmatrix}$$

Figure 13:
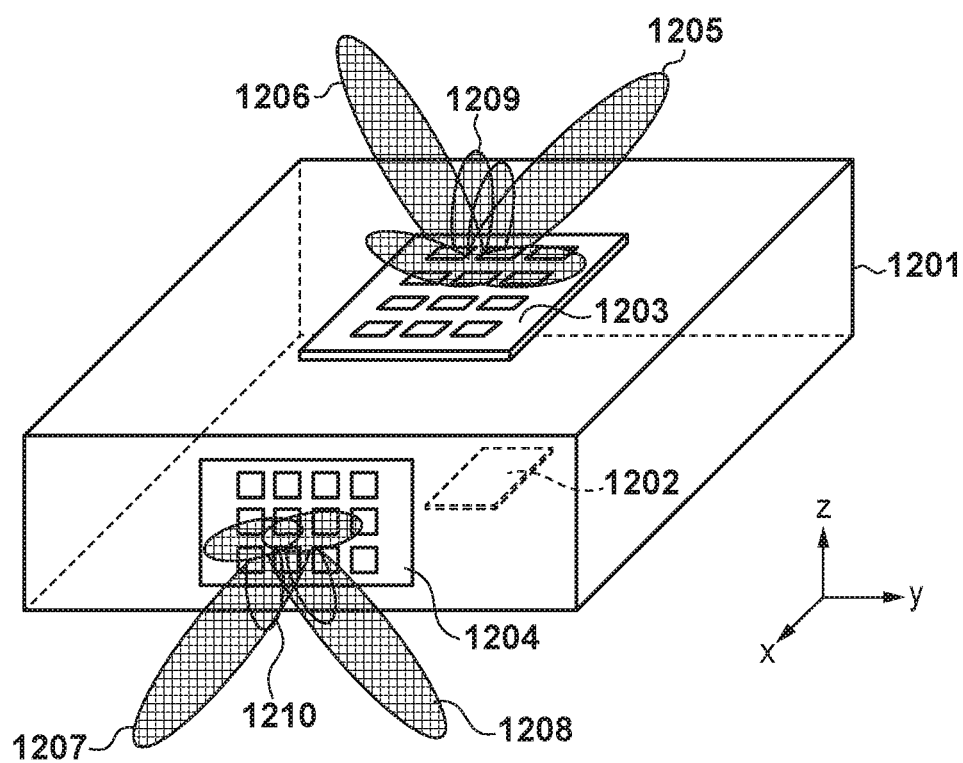
FIG. 13 is a view for explaining the directivity of the transmission beam of the radio transmitter.

FIG. 13 is a view showing the directivity of the beam transmitted by the radio transmitter 100 according to this embodiment. A radio transmitter 1201 includes an RF (Radio Frequency) module 1202, and array antennas 1203 and 1204. The respective array antennas are arranged to form beams in different directions. The array antenna 1203 forms a beam in the z-axis direction, and the array antenna 1204 forms a beam in the x-axis direction. Each array antenna can form a plurality of directivities by changing the shift amounts of respective antenna elements. That is, the array antenna 1203 can form beams 1205 and 1206, and the array antenna 1204 can form beams 1207 and 1208.

The radio transmitter 1201 can form a multi-beam. The formation condition of a multi-beam can be different depending on the embodiment. For example, only beams belonging to the same array antenna may be able to form a multi-beam or only beams belonging to different array antennas may be able to form a multi-beam. As the former case, there is an implementation form in which one RF module and a plurality of array antennas are implemented in a radio transmitter and the array antennas are exclusively driven. As the latter case, there is an implementation form in which a plurality of RF modules and a plurality of array antennas are implemented in a radio transmitter and the plurality of RF modules are driven at the same time. Since the power consumption, the complexity of implementation, and the cost are significantly different between these implementation forms, an appropriate implementation form changes depending on a use case. A multi-beam formation condition according to this embodiment is that beams belong to the same array antennas. That is, it is possible to form a multi-beam 1209 by synthesizing the beams 1205 and 1206, and form a multi-beam 1210 by synthesizing the beams 1207 and 1208. Furthermore, since beams belonging to different array antennas cannot be formed at the same time, it is impossible to form, for example, the beams 1205 and 1209 at the same time.

The directivity synthesis unit 1101 includes a multi-beam formation condition based on the implementation form of the radio transmitter 1201. The directivity synthesis unit 1101 stores a beam formable by the radio transmitter 1201 in association with an array antenna for forming the beam. That is, beam number 1 (beam 1205) and beam number 2 (beam 1206) are associated with antenna 1 (array antenna 1203). Beam number 3 (beam 1207) and beam number 4 (beam 1208) are associated with antenna 2 (array antenna 1204). This allows the directivity synthesis unit 1101 to determine that beam numbers 1 and 2 can undergo directivity synthesis and beam numbers 3 and 4 can undergo directivity synthesis. In this embodiment, the multi-beam formation condition will be described as a condition that "beams belong to the same array antenna". However, this embodiment is applicable even if a condition that "beams belong to different array antennas" is set as a multi-beam formation condition.

(Operation of Radio Communication System)

Figure 14:
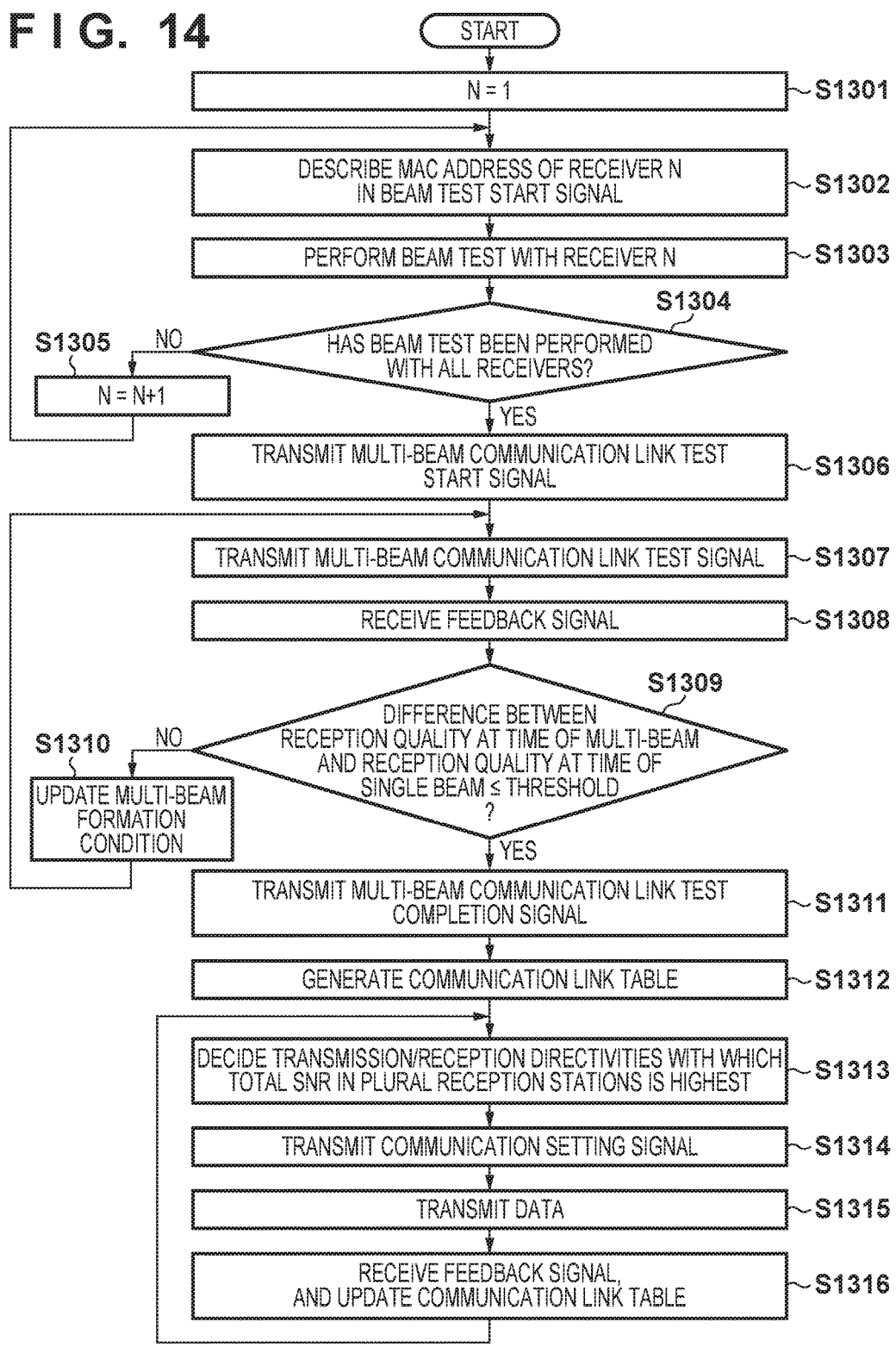
FIG. 14 is a flowchart illustrating the operation procedure of the radio transmitter.

The operations of the radio transmitter 100 and each of the radio receivers 101 to 104 of the radio communication system according to this embodiment will be described with reference to FIGS. 14 and 15. FIG. 14 is a flowchart illustrating the operation procedure of the radio transmitter 100, and FIG. 15 is a flowchart illustrating the operation procedure of each of the radio receivers 101 to 104. Each step of FIG. 14 is executed under the control of a CPU 990 of the radio transmitter 100, and each step of FIG. 15 is executed under the control of the CPU of each of the radio receivers 101 to 104.

The radio transmitter 100 and each of the radio receivers 101 to 104 execute a beam test in steps S1301 to S1305 and S1401 to S1403. The processing procedure of the beam test is the same as in the above-described embodiment and a description thereof will be omitted.

An example in which, as a result of the beam test, the following three communication links are detected as (transmitter antenna directivity, receiver antenna directivity, SNR) between the radio transmitter 100 and the radio receiver 101 will be described.

(Transmitter directivity Beam=4, receiver directivity Beam=5, SNR=30)
(Transmitter directivity Beam=5, receiver directivity Beam=6, SNR=20)
(Transmitter directivity Beam=11, receiver directivity Beam=8, SNR=25)

Similarly, assume that, as a result of the beam test, the following three communication links are detected between the radio transmitter 100 and the radio receiver 102.

(Transmitter directivity Beam=3, receiver directivity Beam=4, SNR=25)
(Transmitter directivity Beam=5, receiver directivity Beam=5, SNR=15)
(Transmitter directivity Beam=12, receiver directivity Beam=6, SNR=50)

Similarly, assume that, as a result of the beam test, the following three communication links are detected between the radio transmitter 100 and the radio receiver 103.

(Transmitter directivity Beam=17, receiver directivity Beam=6, SNR=30)
(Transmitter directivity Beam=18, receiver directivity Beam=5, SNR=20)
(Transmitter directivity Beam=19, receiver directivity Beam=8, SNR=40)

Similarly, assume that, as a result of the beam test, the following three communication links are detected between the radio transmitter 100 and the radio receiver 104.

(Transmitter directivity Beam=5, receiver directivity Beam=1, SNR=20)
(Transmitter directivity Beam=23, receiver directivity Beam=5, SNR=30)
(Transmitter directivity Beam=24, receiver directivity Beam=7, SNR=35)

Note that as in the above-described embodiment, in FIG. 1, the radio transmitter 100 can take 24 transmitter antenna directivities, and each of the radio receivers 101 to 104 can take 8 receiver antenna directivities. From a given direction, the Xtxth (Xtx=1 to 24) transmitter antenna directivity is represented by the transmitter directivity Beam=Xtx, and the Xrxth (Xrx=1 to 8) receiver antenna directivity is represented by the receiver directivity Beam=Xrx.

In steps S1306 to S1311 and S1404 to S1407, a communication link test by a multi-beam is performed. In the multi-beam communication link test, a combination of transmitter antenna directivities among the plurality of transmitter antenna directivities obtained in the beam test, with which a multi-beam can be formed, is selected, a multi-beam transmitter antenna directivity is formed by synthesizing the directivities, and the reception quality in each receiver is inspected. More specifically, a plurality of transmitter antenna directivities which have been detected in the beam test and with which the given communication quality is obtained are synthesized to from a multi-beam, and a test signal is transmitted, thereby measuring degradation in reception quality in the radio receiver. In general, if the directivity is switched from a single beam directivity for directing a beam at a single angle to a multi-beam directivity for directing a beam at a plurality of angles, an antenna gain at a directivity angle is decreased. Even if a multi-beam is formed by driving a plurality of RF modules, it is necessary to divide the output power value of one RF module by a beam count under the communication condition that the output power value of overall radio set needs to be kept constant. Therefore, even if the plurality of RF modules are used, the electric field strength at the directivity angle is decreased. In addition, forming a multi-beam may cause a phenomenon that the multipath increases and the SNR deteriorates. From this viewpoint, it is necessary to measure degradation in reception quality at the time of each of a single beam and multi-beam, and determine whether the degradation is equal to or smaller than a given threshold. The threshold may be obtained by adding 2 dB as a margin to the degree of degradation depending on the beam count. If, for example, the beam count is 2, (gain reduction by beams: 3 dB)+(margin: 5 dB)=8 dB can be set as the threshold.

In step S1306, the radio transmitter 100 transmits, with the omni directivity, a multi-beam communication link test start signal in which the following parameters are described.

Test signal transmission start timing
Duration period of one test signal
Test signal transmission count
MAC addresses of destination receiver
Receiver directivity for each destination reception station at each test signal transmission timing FIG. 16A and FIG. 16B are tables showing a transmitter antenna directivity, a receiver antenna directivity, a reception result, and a multi-beam formation status in the multi-beam communication link test. Referring to FIG. 16A and FIG. 16B, reference numeral 1510 denotes identification information of a receiver; 1511, a transmitter antenna directivity; 1512, a receiver antenna directivity of the receiver identified by the identification information 1510; 1513, an SNR of a signal by a main lobe which has been received with the receiver antenna directivity 1512 by the receiver identified by the identification information 1510 and sent with the transmitter antenna directivity 1511; 1514, identification information of a receiver different from the receiver of the identification information 1510; 1515, a transmitter antenna directivity different from the transmitter antenna directivity 1511; 1516, a receiver antenna directivity of the receiver identified by the identification information 1514; 1517, an SNR of a signal which has been received with the receiver antenna directivity 1516 by the receiver identified by the identification information 1514 and sent with the transmitter antenna directivity 1515; 1518, a multi-beam formation status by a beam of the transmitter antenna directivity 1511 and a beam of the transmitter antenna directivity 1515, which is indicated by ○ or x; and 1519, the presence/absence of degradation in reception quality of a multi-beam when the multi-beam is formed, which is indicated by ○ or x. In FIG. 16A and FIG. 16B, the results denoted by reference numerals 1510 to 1517 are acquired in the beam test (steps S1301 to S1305 and S1401 to S1403). The results denoted by reference numerals 1518 and 1519 are acquired in the multi-beam communication link test (steps S1306 to S1311 and S1404 to S1407).

As described above, the multi-beam formation status changes depending on the implementation forms of the antenna and RF module. The radio transmitter 100 according to this embodiment includes a plurality of antennas and one RF module. Beam=1 to Beam=6, Beam=7 to Beam=12, Beam=13 to Beam=18, and Beam=19 to Beam=24 respectively belong to four different array antennas, and the beams belonging to the same array antenna can form a multi-beam.

In step S1307, among the communication settings with which a multi-beam can be formed, the radio transmitter 100 selects communication settings with which the total value of the receiver SNR 1513 and the SNR 1517 is largest. In the example of FIG. 16A and FIG. 16B, a multi-beam can be formed when conditions (transmitter directivity Beam=11, receiver directivity Beam=8 of radio receiver 1), and (transmitter directivity Beam=12, receiver directivity Beam=6 of radio receiver 2), both of which are indicated by reference numeral 1501, are satisfied, or when conditions (transmitter directivity Beam=24, receiver directivity Beam=7 of radio receiver 4), and (transmitter directivity Beam=19, receiver directivity Beam=8 of radio receiver 3), both of which are indicated by reference numeral 1502, are satisfied.

The total SNR in the two radio receivers is 75 dB, which is largest. Degradation in reception quality caused by the multi-beam is verified under the conditions (transmitter directivity Beam=11, receiver directivity Beam=8 of radio receiver 1), and (transmitter directivity Beam=12, receiver directivity Beam=6 of radio receiver 2).

Next, degradation in reception quality caused by the multi-beam is verified under the conditions (transmitter directivity Beam=24, receiver directivity Beam=7 of radio receiver 4), and (transmitter directivity Beam=19, receiver directivity Beam=8 of radio receiver 3).

Thus, as the MAC address of the destination receiver and the receiver directivity in the multi-beam communication link start signal, (receiver directivity Beam=8 of radio receiver 1), and (receiver directivity Beam=6 of radio receiver 2) are set during the first Duration period of the test signal, and (receiver directivity Beam=7 of radio receiver 4), and (receiver directivity Beam=8 of radio receiver 3) are set during the second Duration period, thereby transmitting the multi-beam communication link test signal.

In step S1404, the radio receiver receives the communication link test start signal. Since the radio transmitter 100 transmits the communication link test start signal, each of all the radio receivers maintains the reception state with the receiver directivity with which the best reception quality is obtained until the radio receiver can receive the above-described radio signal. Upon receiving the above-described radio signal, the radio receiver transfers the above-described radio signal as a wired signal to another radio receiver using a wired I/F unit 310. Thus, each of all the radio receivers acquires the test signal transmission timing of the radio transmitter 100.

In step S1405, the radio receiver determines whether the MAC address of the self station is described in the multi-beam communication link test start signal. If the MAC address of the self station is described (YES in step S1405), the process advances to step S1406; otherwise (NO in step S1405), the process advances to step S1407.

In step S1406, the radio receiver performs a communication link test with the radio transmitter 100, and transmits a measured reception quality result as a feedback signal. The MAC address of the radio receiver, the reception timing, the receiver antenna directivity, and the SNR are described in the feedback signal in addition to the reception quality result.

In step S1308, the radio transmitter 100 receives the feedback signal, and verifies degradation in reception quality caused by the multi-beam. Among the plurality of multi-beam communication links, a multi-beam communication link in which degradation in reception quality is equal to or smaller than a threshold, or a multi-beam communication link in which degradation in communication quality is smaller is selected. For example, when, at the time of multi-beam transmission, the SNR is 15 dB under conditions (transmitter directivity Beam=11, receiver directivity Beam=8 of radio receiver 1), and the SNR is 45 dB under conditions (transmitter directivity Beam=12, receiver directivity Beam=6 of radio receiver 2), the total SNR is 60 dB. When, at the time of multi-beam transmission, the SNR is 30 dB under conditions (transmitter directivity Beam=24, receiver directivity Beam=7 of radio receiver 4), and the SNR is 35 dB under conditions (transmitter directivity Beam=19, receiver directivity Beam=8 of radio receiver 3), the total SNR is 65 dB. In the latter case, since degradation in reception quality in each radio receiver at the time of a multi-beam is equal to or smaller than a threshold, communication setting is performed as follows. That is, transmitter directivity: synthesis directivity of Beam=19 and Beam=24 destination station 1: radio receiver 3, receiver directivity Beam=8 destination station 2: radio receiver 4, receiver directivity Beam=7

Upon completion of the communication setting, the process advances to step S1309.

In step S1309, it is determined whether the difference between the reception quality (SNR) at the time of the multi-beam and that at the time of the single beam is equal to or smaller than a predetermined threshold. If the difference is equal to or smaller than the predetermined threshold (YES in step S1309), the process advances to step S1311; otherwise (NO in step S1309), the process advances to step S1310. For example, if it is determined that all the multi-beam communication link candidates selected in step S1307 exceed the threshold, and the communication quality degrades (NO sin step S1309), the process advances to step S1310. In step S1310, multi-beam formation disable state is determined for the multi-beam selected in step S1307, and the multi-beam formation condition is updated, thereby selecting a new multi-beam communication link as a candidate. In step S1311, the radio transmitter 100 transmits a multi-beam communication link test completion signal, and the process advances to step S1312. On the other hand, in step S1407, the radio receiver receives the multi-beam communication link test completion signal, and the process advances to step S1408.

If a plurality of receivers can receive signals at satisfactory communication quality even after the multi-beam is formed, the multi-beam transmitter antenna directivity is selected to execute radio data communication in steps S1312 to S1316 and S1408 to S1412. More specifically, one of a plurality of combinations of directivities with which the reception quality is best is determined as directivities to be used for data transmission, thereby executing radio data communication with the directivities.

Figure 17:
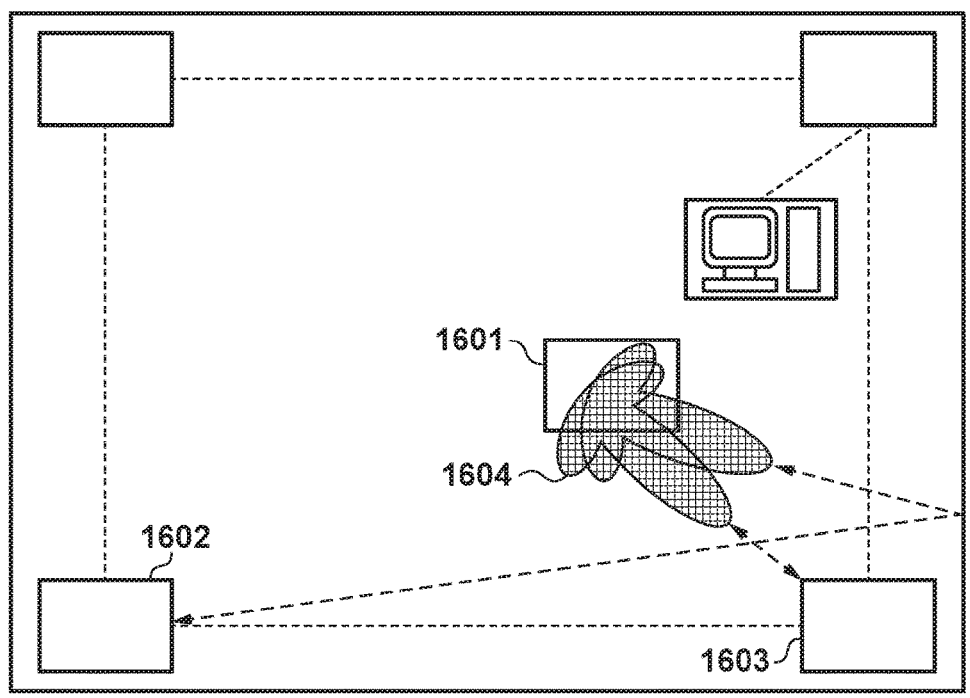
FIG. 17 is a view showing a transmitter antenna directivity.

In step S1312, the radio transmitter 100 creates a communication link table indicating the test result of the multi-beam communication link, and the process advances to step S1313. The communication link table is as shown in, for example, FIG. 16A and FIG. 16B. In the communication link table, a test result about a multi-beam with which a plurality of radio receivers can obtain satisfactory reception qualities is described. FIG. 17 shows the selected antenna directivity. By simultaneously transmitting signals from a radio transmitter 1601 to radio receivers 1602 and 1603 with a multi-beam antenna directivity 1604 for directing a beam to the plurality of radio receivers 1602 and 1603, it is possible to improve the communication robustness without degrading the communication efficiency.

In step S1313, based on the communication link table, the radio transmitter 100 selects the transmitter antenna directivity, destination stations, and the receiver antenna directivity of each destination station with which the total SNR in a plurality of radio receivers is highest.

Figure 6:
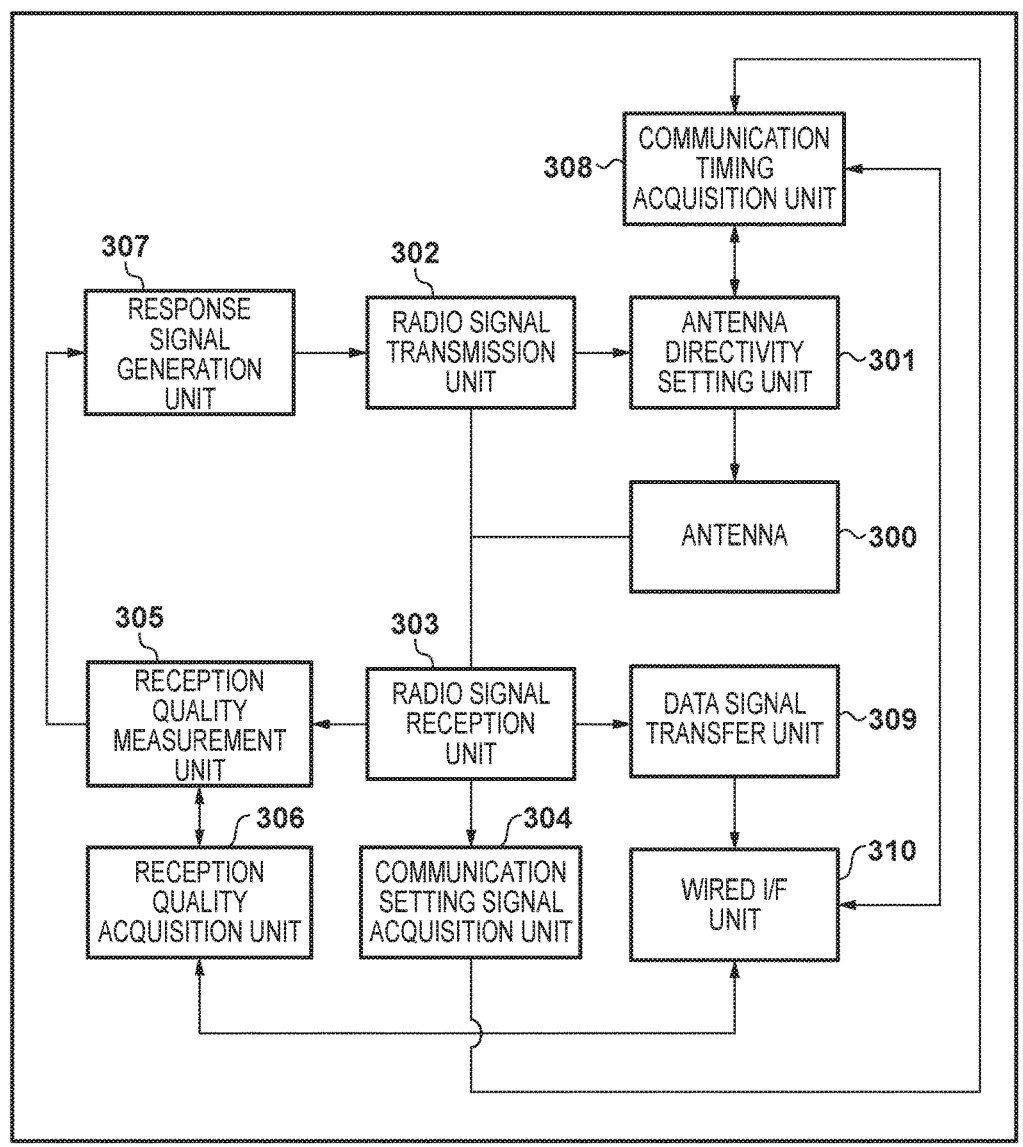
FIG. 6 is a block diagram showing an example of the functional arrangement of a radio receiver.

Note that the subsequent processes in steps S1314 to S1316 of FIG. 14 and steps S1408 to S1412 of FIG. 15 are the same as those in steps S613 to S615 of FIG. 6 and steps S708 to S712 of FIG. 7, and a description thereof will be omitted.

As described above, in this embodiment, a communication apparatus for transmitting data using a directional antenna performs tests of two stages as follows.

For each of a plurality of receivers, a transmitter antenna directivity with which it is possible to transmit a test signal to the receiver by communication by the main lobe is determined (beam test).

A combination of transmitter antenna directivities with which it is possible to transmit a test signal based on communication with a plurality of transmitter antenna directivities included in the transmitter antenna directivities determined in the beam test is determined (multi-beam communication link test).

Then, data is transmitted by deciding the following settings based on the reception quality of communication with each of the transmitter antenna directivities included in the combination of transmitter antenna directivities and the reception quality of communication with the combination of transmitter antenna directivities.

A combination of transmitter antenna directivities to be used to transmit the data Receivers as data reception targets As described above, by determining, by the tests of the two stages, a plurality of transmitter antenna directivities with which it is possible to simultaneously transmit data to a plurality of receivers, it is possible to reliably transmit data to a communication processing apparatus as a final common destination apparatus connected to a receiver which has received a radio signal. Therefore, it is possible to maintain the communication efficiency while improving the robustness against a change in communication environment.

According to the present invention, it is possible to provide a technique capable of maintaining the communication efficiency while improving the robustness against a change in radio environment in a radio communication system using a beam directional antenna.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-215693, filed on Nov. 2, 2015, which is hereby incorporated by reference herein in its entirety.

What is claimed is:

1. A communication apparatus for transmitting data using a directional antenna, comprising:
   a first determination unit adapted to determine, for each of a plurality of receivers, transmitter antenna directivities with each of which it is possible to transmit a test signal to the receiver as a partner receiver by communication by a main lobe;
   a second determination unit adapted to determine, as a monitor receiver, for each of the transmitter antenna directivities determined by the first determination unit, if the test signal is transmitted with the transmitter antenna directivity, a receiver capable of receiving the test signal by a side lobe appended to the main lobe;
   a decision unit adapted to decide, based on reception quality in the partner receiver of the communication by the main lobe and reception quality in the monitor receiver of communication by the side lobe appended to the main lobe, a transmitter antenna directivity to be used to transmit data, and a partner receiver and monitor receiver as reception targets of the data out of the plurality of receivers; and
   a transmission unit adapted to transmit the data to the decided partner receiver and monitor receiver with the transmitter antenna directivity decided by the decision unit.

2. The apparatus according to claim 1, further comprising:
   a reception unit adapted to receive, from each of the plurality of receivers, when the first determination unit and the second determination unit perform determination, reception quality of communication to the receiver,
   wherein the decision unit decides, based on the reception qualities received by the reception unit, the transmitter antenna directivity, and the partner receiver and monitor receiver as the reception targets of the data out of the plurality of receivers.

3. The apparatus according to claim 2, wherein
   the reception unit receives reception qualities from the partner receiver and monitor receiver which are receiving data while the transmission unit transmits the data, and the apparatus further comprises an update unit adapted to update, based on the reception qualities received by the reception unit while the transmission unit transmits the data, the transmitter antenna directivity used to transmit the data, and the partner receiver and monitor receiver as the reception targets of the data.

4. The apparatus according to claim 2, wherein the transmission unit transmits the data at a transmission rate decided based on the reception qualities received by the reception unit.

5. The apparatus according to claim 1, wherein
the first determination unit further determines a receiver antenna directivity in the partner receiver, with which the test signal can be received by the main lobe,
the second determination unit further determines a receiver antenna directivity in the monitor receiver capable of receiving the test signal by the side lobe,
the decision unit further decides receiver antenna directivities in the partner receiver and monitor receiver as the reception targets of the data from the combination of the partner receiver and monitor receiver and the receiver antenna directivities determined for the partner receiver and monitor receiver, and
the apparatus further comprises a notification unit adapted to notify the partner receiver and monitor receiver as the reception targets of the data of the receiver antenna directivities decided by the decision unit.

6. The apparatus according to claim 1, wherein based on a total value of the reception quality of the communication by the main lobe and the reception quality of the communication by the side lobe appended to the main lobe, the decision unit decides the transmitter antenna directivity to be used to transmit the data, and the partner receiver and monitor receiver as the reception targets of the data.

7. The apparatus according to claim 1, wherein if all reception qualities in the monitor receiver are smaller than a predetermined threshold, the decision unit decides, based on the reception quality of the communication by the main lobe with respect to the partner receiver, the transmitter antenna directivity, and the partner receiver and monitor receiver as the reception targets of the data.

8. The apparatus according to claim 1, wherein the first determination unit determines a transmitter antenna directivity with which it is possible to transmit the test signal at reception quality not lower than a predetermined threshold.

9. The apparatus according to claim 1, wherein the second determination unit determines, as the monitor receiver, a receiver capable of receiving the test signal at reception quality not lower than a predetermined threshold.

10. A communication apparatus for transmitting data using a directional antenna, comprising:
a first determination unit adapted to determine, for each of a plurality of receivers, transmitter antenna directivities with each of which it is possible to transmit a test signal to the receiver by communication by a main lobe;
a second determination unit adapted to determine a combination of transmitter antenna directivities with which it is possible to transmit the test signal based on communications with a plurality of transmitter antenna directivities included in the transmitter antenna directivities determined by the first determination unit;
a decision unit adapted to decide, based on reception qualities of the communications with transmitter antenna directivities included in the combination of transmitter antenna directivities, a combination of transmitter antenna directivities to be used to transmit data and a receiver as a reception target of the data; and
a transmission unit adapted to transmit the data to the decided receiver with the combination of transmitter antenna directivities decided by the decision unit.

11. The apparatus according to claim 10, wherein based on a total of reception qualities of communications with the respective transmitter antenna directivities included in the combination of transmitter antenna directivities, the decision unit decides the combination of transmitter antenna directivities to be used to transmit the data and the receiver as the reception target of the data.

12. The apparatus according to claim 10, further comprising:
a reception unit adapted to receive, from each of the plurality of receivers, when the first determination unit and the second determination unit perform determination, reception quality of communication to the receiver,
wherein the decision unit decides, based on the reception qualities received by the reception unit, the combination of transmitter antenna directivities, and the receiver as the reception target of the data.

13. The apparatus according to claim 12, wherein
the reception unit receives reception quality from a receiver which is receiving data while the transmission unit transmits the data, and
the apparatus further comprises an update unit adapted to update, based on the reception quality received by the reception unit while the transmission unit transmits the data, the combination of transmitter antenna directivities used to transmit the data, and the receiver as the reception target of the data.

14. The apparatus according to claim 10, wherein
the first determination unit further determines a receiver antenna directivity in the receiver, with which the test signal can be received,
the decision unit further decides a receiver antenna directivity in the receiver as the reception target of the data from the combination of the receiver and the receiver antenna directivity determined for the receiver, and
the apparatus further comprises a notification unit adapted to notify the receiver as the reception target of the data of the receiver antenna directivity decided by the decision unit.

15. The apparatus according to claim 10, wherein the first determination unit determines a transmitter antenna directivity with which it is possible to transmit the test signal at reception quality not lower than a predetermined threshold.

16. The apparatus according to claim 10, wherein the second determination unit determines a combination of transmitter antenna directivities with which it is possible to transmit the test signal at reception quality not lower than a predetermined threshold.

17. A communication method using a directional antenna 1, comprising:
causing a first determination unit to determine, for each of a plurality of receivers, transmitter antenna directivities with each of which it is possible to transmit a test signal to the receiver as a partner receiver by communication by a main lobe;
causing a second determination unit to determine, as a monitor receiver, for each of the transmitter antenna directivities determined in the causing the first determination unit, if the test signal is transmitted with the transmitter antenna directivity, a receiver capable of receiving the test signal by a side lobe appended to the main lobe;

causing a decision unit to decide, based on reception quality in the partner receiver of the communication by the main lobe and reception quality in the monitor receiver of communication by the side lobe appended to the main lobe, a transmitter antenna directivity to be used to transmit data, and a partner receiver and monitor receiver as reception targets of the data out of the plurality of receivers; and causing a transmission unit to transmit the data to the decided partner receiver and monitor receiver with the transmitter antenna directivity decided in the causing the decision unit.

18. A communication method using a directional antenna, comprising:

causing a first determination unit to determine, for each of a plurality of receivers, transmitter antenna directivities with each of which it is possible to transmit a test signal to the receiver by communication by a main lobe;

causing a second determination unit to determine a combination of transmitter antenna directivities with which it is possible to transmit the test signal based on communications with a plurality of transmitter antenna directivities included in the transmitter antenna directivities determined in the causing the first determination unit;

causing a decision unit to decide, based on reception qualities of the communications with transmitter antenna directivities included in the combination of transmitter antenna directivities, a combination of transmitter antenna directivities to be used to transmit data and a receiver as a reception target of the data; and causing a transmission unit to transmit the data to the decided receiver with the combination of transmitter antenna directivities decided in the causing the decision unit.

19. A non-transitory computer-readable storage medium storing a computer program for causing a computer to function as each unit of a communication apparatus for transmitting data using a directional antenna, the communication apparatus comprising:

a first determination unit adapted to determine, for each of a plurality of receivers, transmitter antenna directivities with each of which it is possible to transmit a test signal to the receiver as a partner receiver by communication by a main lobe;

a second determination unit adapted to determine, as a monitor receiver, for each of the transmitter antenna directivities determined by the first determination unit, if the test signal is transmitted with the transmitter antenna directivity, a receiver capable of receiving the test signal by a side lobe appended to the main lobe;

a decision unit adapted to decide, based on reception quality in the partner receiver of the communication by the main lobe and reception quality in the monitor receiver of communication by the side lobe appended to the main lobe, a transmitter antenna directivity to be used to transmit data, and a partner receiver and monitor receiver as reception targets of the data out of the plurality of receivers; and a transmission unit adapted to transmit the data to the decided partner receiver and monitor receiver with the transmitter antenna directivity decided by the decision unit.

\* \* \* \* \*